United States Patent [19]

Hefner, Jr.

[11] Patent Number: 4,777,209

[45] Date of Patent: Oct. 11, 1988

[54] COMPOSITIONS OF POLYCYCLOALKENYL-TERMINATED, UNSATURATED POLYESTERS OR POLYESTERAMIDES AND VINYL-REACTIVE PLASTICIZERS THEREFOR

[75] Inventor: Robert E. Hefner, Jr., Lake Jackson, Tex.

[73] Assignee: The Dow Chemical Company, Midland, Mich.

[21] Appl. No.: 708,754

[22] Filed: Mar. 6, 1985

Related U.S. Application Data

[63] Continuation-in-part of Ser. No. 684,827, Dec. 21, 1984, abandoned, which is a continuation-in-part of Ser. No. 502,869, Jun. 9, 1983, abandoned.

[51] Int. Cl.$^4$ .................. C08L 67/06; C08L 77/12
[52] U.S. Cl. ................................. 525/28; 525/421; 525/440; 525/920
[58] Field of Search ............... 525/28, 421, 440, 920

[56] References Cited

U.S. PATENT DOCUMENTS

| | | | |
|---|---|---|---|
| 2,970,984 | 2/1961 | D'Alelio | 525/528 |
| 3,297,745 | 1/1967 | Fekete | 525/920 |
| 3,448,172 | 6/1969 | Damusis | 525/920 |
| 3,644,569 | 2/1972 | Pietsch | 525/28 |
| 3,787,526 | 1/1974 | Burns | 525/42 |
| 3,891,523 | 6/1975 | Hisamatsu | 525/28 |
| 4,167,542 | 9/1979 | Nelson | 525/445 |
| 4,233,432 | 11/1980 | Curtis | 525/49 |
| 4,360,653 | 1/1982 | Stevens | 525/404 |
| 4,390,662 | 6/1983 | Ando | 525/28 |
| 4,409,371 | 10/1983 | Hefner | 525/418 |
| 4,410,686 | 10/1983 | Hefner | 528/288 |
| 4,413,072 | 11/1983 | Hess | 523/500 |
| 4,421,894 | 12/1983 | O'Connor | 525/28 |

*Primary Examiner*—Patricia Short
*Attorney, Agent, or Firm*—Robert R. Stringham

[57] ABSTRACT

Polycycloalkenyl-terminated, unsaturated polyesters or polyesteramide compositions, including or not including non-resinous vinyl monomers, are flexibilized by incorporation in the uncured composition of vinyl-terminated urethane oligomers comprising at least one polyglycol unit.

42 Claims, No Drawings

COMPOSITIONS OF POLYCYCLOALKENYL-TERMINATED, UNSATURATED POLYESTERS OR POLYESTERAMIDES AND VINYL-REACTIVE PLASTICIZERS THEREFOR

CROSS-REFERENCE TO RELATED APPLICATIONS

This is a continuation-in-part of application Ser. No. 684,827, filed Dec. 21, 1984, now abandoned, which in turn is a continuation-in-part of application Ser. No. 502,869, filed June 9, 1983, now abandoned.

U.S. patent applications, Ser. Nos. 333,221 and 366,507, filed on Dec. 21, 1981, and Apr. 8, 1982, respectively, (in the name of the present applicant as inventor) disclose unsaturated polyesteramides which have been modified by incorporation therein of at least one terminal group derived from cyclopentadiene or dicyclopentadiene.

BACKGROUND OF THE INVENTION

U.S. Pat. Nos. 4,148,765 and 4,233,432 disclose dicyclopentadiene-modified, unsaturated polyesters. The latter esters have good properties in other respects but are inherently low in tensile strength, percent elongation, impact strength and ductility; this is true also of the polyesteramides disclosed in the above-identified applications. If the several foregoing types of polyesters could be improved in the latter regards, while largely retaining their other properties, this would be highly significant to certain applications—such as, for example, pultrusion-formed, oil well sucker rods.

U.S. Pat. No. 3,297,745 discloses, a homo- and co-polymerizable "monomers", certain oligomeric urethane chains capped with vinyl-terminated end groups. A copolymer derived from styrene, an allyloxy-terminated oligomer and a methacryloxy-terminated oligomer is stated to have had higher tensile and flexural moduli than homopolymers of any of the three monomers.

U.S. Pat. No. 4,360,653 discloses impact-resistance polymerizates of the latter types of oligomers with allyl carbonates of polyols.

U.S. Pat. No. 4,390,662 (Ando et al; June 28, 1983; effective reference date Mar. 25, 1981) teaches toughening of polyester and vinyl ester resins (vinyl esters plus styrene) with unsaturated polyurethanes prepared by reacting 1 molecular proportion of an organic diol with from 0.7 to 1 molecular proportion of a diisocyanate and capping the resulting adduct with 2 molecular proportions of a hydroxyalkylacrylate. The Ando polyurethanes have molecular weights corresponding to "weight-average molecular chain extensions, calculated as polystyrene," of from 100 to 1500Å, preferably from 200 to 1000Å, most preferably from 300 to 1000Å. That is, the rectilinear length of an unstraightened polystyrene molecule having a molecular weight equal to the weight average molecular weight of the polyurethane is from 100 to 1500Å, etc. A length range of from 100 to 1000Å corresponds to a molecular weight range of from about 22,295 to about 2,229,500.

The patent teaches that in order to be an effective toughener, the polyurethane must phase out upon curing of polyester/styrene/urethane compositions (but must not phase out upon curing of vinyl ester/styrene urethane compositions).

Thus, the patent teaches away from the use of oligomeric urethanes for toughening of either polyester or vinyl ester resins. It also teaches away from toughening of polyester resins with urethanes which do not phase out upon curing.

Definitions of Terms

The term "polycycloalkenyl" as used herein is intended to designate a polycyclic hydrocarbon radical containing a reactive, cycloolefinic double bond; for example, a radical derived from the dimer of cyclopentadiene may be designated as a "tricyclodecenyl" radical and a norbornenyl radical may be designated as a "dicycloheptenyl" radical.

The term "urethane oligomer" (or "oligomeric urethane") is used herein to designate polymeric molecules made up, except for end groups, of polyetherglycol and "urethane" units in detail subsequently herein) and having weight average molecular weights of less than about 22,000; preferably, less than about 9400.

For convenience, the unmodified term "alkyd" is used herein to designate both polyesters and polyesteramides, per se, whereas the term "alkyd resin" is intended to refer to mixtures of th alkyds and vinyl monomers (such as styrene, for example).

The symbol $=NH$ is used herein to represent $-NH_2$ or $NHR$ groups (R being defined later herein) or divalent NH groups in which the N is a member of a heterocyclic ring.

OBJECTS OF THE INVENTION

The primary object of the present invention is to improve the ductility, percent elongation, impact strength and tensile strength of polycycloalkenyl-terminated, unsaturated polyesters and polyesteramides while largely retaining the other properties thereof; i.e., to "flexibilize" them without adversely effecting them otherwise.

A further object is to provide for attainment of the primary object in a direct and simple manner, as by mixing the subject polyester alkyds with vinyl-terminated, oligomeric urethanes—which do not phase out when the mixture is cured.

An additional object is to utilize certain known, readily made types of urethane oligomers as the latter flexibilizers.

A principle object is to provide flexibilized, cured compositions of polycycloalkenyl-terminated polyesters or polyesteramides with vinyl monomers, such as—for example—styrene and various acrylate monomers.

Still other objects will be made apparent to those knowledgeable in the art by the following specifications and claims.

SUMMARY OF THE INVENTION

The compositions of the invention are summarily described by the title of the present application; the term "composition" therein is intended to apply to mixtures of the polyesters or polyesteramides and the oligomers which do or do not include vinyl monomers. Broadly, the process of the invention is to mix together the foregoing components of the compositions.

The composition may be more precisely defined as a curable, flexibilized polyester composition comprising, in admixture:

a. an unsaturated polyester- or polyesteramidealkyd having at least one polycycloalkenyl end group and optionally including a polyglycol-derived flexibilizing group, b. a flexibilizing, polyglycol moiety-comprising urethane oligomer having (1) two or more terminal groups, at least one of which is vinyl-reactive, and (2) a weight average molecular chain extension, calculated as polystyrene, of less than 100Å.
and, optionally,
c. from about 25 to about 400 parts by weight of a non-resinous, vinyl monomer per hundred parts of said alkyd;

the parts by weight of said oligomer per hundred parts of said alkyd being such that the oligomer will not phase out when said composition is cured and being within the range of from about 1 to about 60 when the alkyd includes said flexibilizing group but being about 20 or less when the latter group is not included in the alkyd.

DETAILED DESCRIPTION

Dicyclopentadiene-modified, unsaturated polyesters represent a relatively new class of polyesters which, as alkyd resins, have improved economics and many highly useful properties, such as low shrinkage upon curing and excellent resistance to corrosion by aqueous media.

The new class of polyester alkyds represented by the unsaturated polyesteramides of the above-referenced applications exhibit (as the alkyd resins) not only the desirable properties of the known dicyclopentadiene-modified polyesters also exhibit improved reactivity, excellent resistance to organic solvents, excellent electrical insulating properties and excellent resistance to thermal aging.

Both of the foregoing classes of alkyd resins tend to be inherently low in tensile strength, impact strength, percent elongation, ductility and, to a lesser extent, in flexural strength. Only a limited improvement is realized when the known ploy of using mixed glycols or glycol ethers is employed in forming the dicyclopentadiene (or cyclopentadiene)—modified polyesters or polyesteramides. However, it has now been found that mixtures of the latter types of resins with vinyl-terminated urethane oligomers ("vinyl reactive plasticizers" or VRP's) provide cured compositions possessing substantially improved mechanical properties.

Polycycloalkenyl-terminated, unsaturated polyesters and polyester amides

Representative of one type of polyester component of the present invention are those derived (predominantly) from maleic acid and propylene glycol. These may be depicted by the ideal or statistical structure,

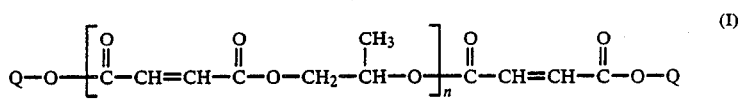

wherein Q, in at least one occurrence, is a polycycloalkenyl radical such as, for example, a tricyclodecenyl or bicycloheptenyl radical, i.e.,

or is a radical of the formula

for example; when Q is not a polycycloalkenyl radical in the second occurrence, it may be —OH, =NH or —COOH. Preferably, Q is a polycycloalkenyl group in both occurrences, in at least a major proportion of the alkyd molecules, and m and n are integers from 1 to about 10 and 1 to about 100, respectively.

Representative of another type of polyester component of the present invention are those derived in part from maleic acid, endomethylenetetrahydrophthalic acid, and propylene glycol. The endomethylenetetrahydrophthalic acid groups may be incorporated by partial replacement of maleic acid therewith or by generation in situ by Diels-Alder reaction of cyclopentadiene (derived from dicyclopentadiene) and maleic anhydride. These alkyds may be depicted by the ideal or statistical structure,

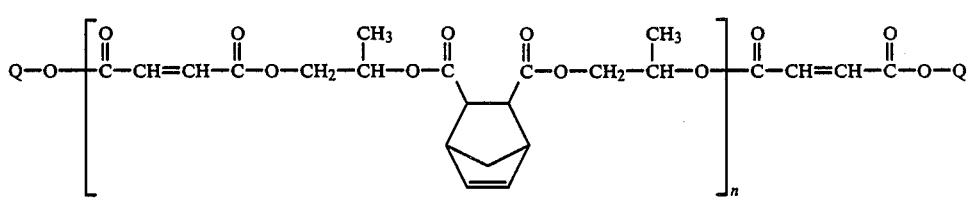

wherein Q, m and n have the same meanings as in structure I. Again, Q is preferably a polycycloalkenyl group in both occurrences, in at least a predominant proportion of the alkyd molecules.

Representative of one type of the polyesteramide component of the present invention are those derivable from maleic acid, propylene glycol and ethylene diamine. These may be depicted by the ideal or statistical structure

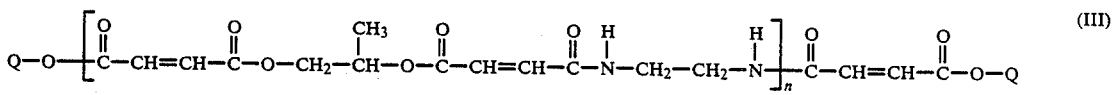

wherein Q, m and n have the same meaning as in structure I. Again, Q is preferably a polycycloalkenyl group in both occurrences, in at least a predominant proportion of the alkyd molecules.

In each of the foregoing types of structures (I, II and III) the polycycloalkenyl radicals in a given molecule or in different molecules do not have to be the same. For example, when dicyclopentadiene is employed to modify a polyester, it can react by adduction of a double bond with an alcoholic or carboxylic —OH group (preferably the latter) to form a terminal group of formula (a); however, it can also "crack" to provide monomeric cyclopentadiene which in turn can form Diels-Alder adducts with dienophilic carbon to carbon double bonds—such as are present in maleic anhydride, maleic acid and polycycloalkenyl end groups. Termination with the above type (b) group may result from in-situ formation of endomethylenetetrahydrophthalic anhydride. Type (c) end groups may form by successive additions of cyclopentadiene to a type (a) group.

Although dicyclopentadiene (as a commercial "DCPD concentrate") is the modifier of economic choice, incorporation of terminal polycycloalkenyl radicals of types other than the preceding (a), (b) and (c) groups is not ruled out. In fact, such other groups may be derived from components of DCPD concentrates other than DCPD itself, such as—for example—a cyclopentadiene co-dimer, an isoprene dimer or the trimers of cyclopentadiene (pentacycloalkadienes which react to form a pentacycloalkenyl radical).

Other examples of precursors to polycycloalkenyl radicals are the Diels-Alder adducts of: (1) butadiene, isoprene or cis- or transpiperylene with dicyclopentadiene, (2) butadiene, isoprene, a piperylene or cyclopentadiene with bicyclo[2,2,1]hepta-2,5-diene and (3) cyclohexadiene-1,3 with butadiene, isoprene, a piperylene, cyclopentadiene or itself.

Toluene sulfonic acid-catalyzed addition of —COOH groups to the afore-named bicycloheptadiene to form esters is known. The products consist predominantly of saturated esters having a nortricyclene structure but also include substantial amounts of the bicycloheptenyl esters. Reaction of a carboxyl end-group in a polyester moiety with one of the double bonds in the bicycloheptadiene should then result in production of a substantial content of bicycloheptenyl terminations.

Thus, di- to decacyloalkenyl terminal groups may be introduced in the polyester or polyesteramide components of the present invention by utilizing a variety of known types of alicyclic diolefins. Polycycloalkadienes of more than five (fused) rings can be utilized but are considered definitely less desirable.

An alternative method of incorporating dicyclopentadiene or norbornene moieties is to esterify an alcoholic hydroxyl-terminated polyester/esteramide chain with a dicyclopentadiene acrylic acid, 5-norbornene-2-acrylic acid or the Diels-Alder adduct of cyclopentadiene with acrylic acid. In still another method, the norbornene group may be incorporated by reaction of a carboxyl-terminated polyester moiety with 5-norbornene-2-ol or dicyclopentadiene monoalcohol.

The polycycloalkenyl-terminated polyesters suitable for the practice of the present invention are then those which are derivable from cyclic diolefins, difunctional carboxylic acids and polyols, and include at least one polycycloalkenyl end group and another end group which is an —OH, =NH, —COOH or polycycloalkenyl group; said acid consisting of at least partially of an α,β-unsaturated diacid and any remainder consisting of saturated aliphatic acid(s), aromatic acid(s) or mixtures thereof and said polyol being of the formula HO—R$^4$—OH, as subsequently defined herein.

The latter polyesters are generally preparable by the methods disclosed in U.S. Pat. Nos. 4,189,548; 4,167,542 and 4,148,765 for making dicyclopentadiene-modified polyesters. The latter methods may be modified according to the foregoing discussion of ways of introducing polycycloalkenyl groups other than those derivable directly from dicyclopentadiene (or cyclopentadiene) per se.

The polycycloalkenyl-terminated polyesteramides employed in the present invention are those having a central esteramide chain consisting essentially of:

(a) diamino groups of the formula:

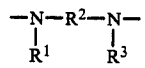

wherein $R^1$ and $R^3$ are independently selected from the group consisting of hydrogen, aliphatic, cycloaliphatic and aromatic or $R^1$ and $R^3$ together form an aliphatic ring, and $R^2$ is a divalent organic radical selected from the group consisting of alkylene, oxy-linked alkylene, oxy-linked arylene, alkylene amino-linked alkylene, alkylene amino-linked cycloalkylene, cycloalkylene, polycycloalkylene, arylene, alkylarylene bis(alkyl)cycloalkylene and bis(alkyl)polycycloalkylene, (b) dioxy groups of the formula:

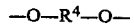

wherein $R^4$ is a divalent organic radical selected from the group consisting of alkylene, oxy-linked alkylene, oxy-linked arylene, cycloalkylene, polycycloalkylene, bis(alkyl)cycloalkylene, bis(alkyl)polycycloalkylene, and arylene, and mono- to trihydroxy alkylene;

and (c) diacyl residues of difunction carboxylic acids, at least part of said acids being α,β-unsaturated acids and any remainder being saturated aliphatic acids, aromatic acids or mixtures thereof.

Typical diamine components of the foregoing polyesteramides are ethylene diamine, propylene diamine, hexane-1,6-diamine, piperazine, 4,4′-methylenebis(cyclohexylamine), 2,2′-bis(4-aminocyclohexyl)propane, 4,4′-diaminodiphenyl ether, bis(aminomethyl)norbornane, toluene diamine, bis(aminomethyl)dicyclopentadiene and homopiperazine. Typical polyamines are aminoethylpiperazine and diethylenetriamine.

The polyol component of the polyester or polyesteramide is from the class having the formula:

HO—R⁴—OH wherein $R^4$ is as above defined. Mixtures of two or more such polyols can be used.

Representative such polyols are ethylene glycol, propylene glycol, diethylene glycol, dipropylene glycol, dicyclopentadiene dimethanol, bis(hydroxymethyl)norbornane, methyl cyclohexanedimethanol, bis(-hydroxypropyl)bisphenol A and other hydroxyalkylated bisphenols, pentaerytritol, sorbitol and glycerine.

When a polyesteramide is to be used, the ratio of diamine to polyol therein can be varied within wide limits. The latter ratio is significantly related to the solubility of the modified polyesteramide in reactive diluents, such as styrene, which are commonly employed with polyesteramides for many applications. As a general rule, the moles of diamine should not exceed about ⅓ the combined moles of the polyol and diamine. The structure and size of the diamine molecule will determine to great extent the maximum amount of diamine that can be used.

The unsaturated polycarboxylic acid component of the polyester or polyesteramide preferably is largely composed of an α,β-unsaturated acid, such as maleic acid, fumaric acid, maleic anhydride or mixtures of those compounds. The latter acids are readily available, have good reactivity with the polyol and/or diamine, and result in products of good properties.

Part of the α,β-unsaturated acid may be further replaced with a saturated or aromatic polycarboxylic acid to vary the cross-linking potential and physical properties of the modified polyester or polyesteramide. Such acids include the aliphatic acids such as adipic acid and the aromatic acids such as isophthalic acid. Replacement of part of the α,β-unsaturated acid with such acids is commonplace in the polyester art. Suitable selection of the acid and the amount thereof to achieve a desired purpose will be known to the skilled worker and can be optimized with simple preliminary experiments.

When endomethylenetetrahydrophthalic acid or anhydride is used, it may be prepared separately or in situ by known methods. Furthermore, it may be composed totally or partially of the corresponding methyl endomethylenetetrahydrophthalic anhydride.

The modified polyesteramides can be prepared by a variety of techniques. In one of the most preferred methods, hereinafter called the "hydrolysis method," an α,β-unsaturated polycarboxylic anhydride and/or acid is partially hydrolyzed with less than the stoichiometric equivalent of water and reacted with less than or equal to the stoichiometric equivalent of the dicyclopentadiene derivative to form a product containing the esterified derivative, any (preferably no) unreacted derivative and the unesterified acid and anhydride. This reaction may conveniently be performed in stages whereby reactants are added stepwise, thus controlling exotherms. The resulting reaction mixture is then reacted with the polyol and diamine to produce the desired modified polyesteramide.

In a typical procedure, molten maleic anhydride and a fraction of the stoichiometric equivalent of water are maintained at an elevated temperature of from about 60° to 130° C. The initial fractional equivalent of dicyclopentadiene (DCPD) is then added and allowed to react. A second fractional equivalent of water and of DCPD is added and allowed to react. Additional fractional equivalents of DCPD are added and each allowed to react before subsequent addition of the next increment until the desired amount of DCPD has been added. The number of fractional equivalents can be increased and the increment size accordingly decreased to afford any desired number of increments. If desired, the DCPD addition can be continuous. Optionally, the relative sizes of successive increments or the rate of continuous addition may vary.

To the mixture of esterified DCPD, unreacted α,β-unsaturated polycarboxylic acid and/or anhydride, is added the polyol and diamine. The addition can be a bulk addition wherein all of the polyol and diamine are added in one step. Alternatively, the addition can be an incremental addition wherein all of the polyol and a fractional equivalent of the diamine are added initially and allowed to react after which subsequent increments of diamine are added. In all instances, water is continuously removed during the esteramidation step. The timing of the remaining diamine additions can be easily determined by the amount of water removed, by acid number and/or by viscosity. A convenient and practical guide is to add a diamine increment when about one fourth to one half of the expected water from the reaction has been collected. Incremental diamine addition aids in the control of reaction exotherm when certain diamines are used.

After addition of the polyol and diamine is complete, the reaction can be given to maximum yield by maintaining or increasing the temperature, preferably from 160° to 205° C., until the desired acid number has been reached. Typically, acid numbers of 15 to 35 are preferred, although acid numbers that are somewhat higher or lower may be tolerated, and, in some instances, may be desired for certain applications.

In an equally preferred method, hereinafter called the "prehydrolysis method", an α,β-unsaturated polycarboxylic anhydride is essentially totally hydrolyzed with a stoichiometric or greater equivalent of water and reacted with less than or equal to the stoichiometric equivalent of the dicyclopentadiene derivative to form a product containing esterified dicyclopentadiene derivative, the unreacted derivative (if any), and the unesterified acid. This reaction may conveniently be performed in stages whereby reactants are added stepwise, thus controlling reaction exotherms. The product mixture is then reacted with the polyol and diamine as earlier mentioned to result in the desired modified polyesteramide.

In a typical procedure, molten maleic anhydride and the stoichiometric or greater equivalent or water are maintained at an elevated temperature of from about 60° to 130° C. The temperature is allowed to stabilize at about 120° to 125° C. and the intial fractional equivalent of DCPD is then added and allowed to react. A second fractional equivalent of DCPD is then added and allowed to react. Additional fractional equivalents of DCPD are added and each allowed to react, before subsequent addition of the next increment, until the desired amount of DCPD has been added to the product mixture.

The polyol and diamine are added to the mixture of esterified DCPD and acid as described in the aforementioned hydrolysis method.

In a preferred method, hereinafter called the "direct method," maleic anhydride and/or acid and the desired amount of DCPD are reacted at an elevated temperature to form endomethylenetetrahydrophthalic anhydride. After cooling the reaction mixture, the unreacted maleic anhydride is hydrolyzed with less than, equal to or greater than the a stoichiometric equivalent of water and reacted with additional dicyclopentadiene derivative to form a product containing an esterified DCPD derivative and unesterified acids and/or anhydrides. This reaction may conveniently be performed in stages whereby reactants are added stepwise, thus controlling reaction exotherms. The product mixture is then reacted with the polyol and diamine as earlier mentioned to result in the desired modified polyesteramide.

In a typical procedure, molten maleic anhydride and the desired amount of DCPD are maintained at an elevated temperature of from about 130° to 170° C. to form endomethylenetetrahydrophthalic anhydride. The temperature is then allowed to stabilize at about 60° to 130° C. and a fractional equivalent of water is added. A fractional equivalent of DCPD is added and allowed to react. A second fractional equivalent of water and of DCPD is added and allowed to react. Additional fractional equivalents of DCPD are added and each allowed to react before subsequent addition of the next increment until the desired amount of DCPD has been added.

The polyol and diamine are added to the mixture of esterified DCPD and acids and/or anhydrides as described in the aforementioned hydrolysis method.

When a dicyclopentadiene concentrate containing piperylene and/or isoprene codimers of cyclopentadiene is used, dedimerization of said codimers followed by subsequent reaction of piperylene and/or isoprene with maleic anhydride and/or acid leads to formation of methyl tetrahydrophthalic anhydrides and/or acids. The methyl tetrahydrophthalyl groups are incorporated into the esteramide chains in a manner identical to that of the endomethylenetetrahydrophthalyl groups. If methyldicyclopentadiene is used, methyl cyclopentadiene will form, resulting in formation of Diels-Alder adducts thereof.

In a further modification of either the hydrolysis, prehydrolysis or direct method, a polyol containing 3 or more hydroxyl groups such as pentaerythritol may be separately added to the reaction after polyesteramidation is substantially complete. This serves to rapidly increase molecular weight and viscosity by cross-linking of the esteramide chains. Modified physical properties result from this embodiment.

Many other alternate methods will be apparent to the skilled worker. For example, molten maleic anhydride may be added to a mixture of DCPD and water maintained in a reactor. The polyol and diamine can then be added to the mixture of esterified DCPD and acids and/or anhydrides as before. Finally, although less preferred, DCPD, maleic anhydride, water, glycol, and none, all or part of the diamine may be simultaneously reacted.

Vinyl Reactive Plasticizer Constitution

The VRP component of the composition of the invention is a polyglycol moiety-comprising urethane oligomer having end groups of which at least one is vinyl-reactive (i.e., contains a polymerizable carbon-to-carbon double bond).

The oligomers of this type disclosed (as "monomers") in the aforementioned '745 and '653 patents are generally suitable for the practice of the present invention. Similar oligomers in which the end groups are incorporated as hydroxyalkyl acrylate-initiated polyglycols, rather than as the hydroxyalkyl acrylates per se, are not only suitable but advantageous in the VRP role.

Also suitable VRP's are the bis(N-vinylcarbamates) formed by the reaction of an unsaturated isocyanate with a polyglycol. Suitable such isocyanates are vinyl isocyanate and isopropentyl isocyanate—as disclosed in U.S. Pat. No. 3,598,866; see Example 8 therein. Similarly, polyadducts of isocyanatoethyl methacrylate, allyl isocyanate, allyl isothiocyanate or allyl glycidyl ether with polyglycols also may be used as the VRP component.

The VRP component of the compositions of the invention alternatively may be of the novel type described in my co-pending U.S. patent application Ser. No. 461,342, filed Jan. 27, 1983. This type of VRP is prepared by the reaction of a vinyl- or acryloxy-substituted phenol or phenol-initiated polyol with at least one of the terminal isocyanate (or isothiocyanate) groups in a urethane oligomer formed by reaction of an excess of a difunctional isocyanate (or thiocyanate) with a polyol. The preferred vinyl-substituted phenol for this purpose is phenol itself, substituted by an isopropentyl group. However, such other phenols as cresols ring-substituted with ethenyl, allyl or isopropenyl groups are also suitable and the polyol portion of the molecule may be terminated by an —NH$_2$ group.

The most generally suitable and economic VRP's presently known of are products of (1) a diisocyanate, (2) a hydroxy- or aminoalkylacrylate and (3) a polyglycol or amino-capped polyglycol. In these VRP's, the alkyl portion of the hydroxy- or aminoalkylacrylate may be interrupted by one or more oxygen or sulfur atoms; i.e., the hydroxy-substituted acrylate may be a monoacrylate of diethylene- or tripropylene glycol, for example. Also, N-methylol acrylamide may be employed in place of a hydroxyalkylacrylate as a source of vinyl end groups in such VRP's.

In each of the several foregoing types of unsaturated adducts, the polyglycol moiety preferably is derived from a diol (by base catalyzed reaction with an alkylene oxide) but desirably is based on (initiated with) a triol—such as glycerine or triethanol amine, for example—, an aminoalcohol or a polyfunctional amine. Since isocyanates will react with —NH, as well as with —OH (or —SH) groups, the polyglycol unit(s) may be amino-caped and/or the —OH function in an end group precursor—such as 2-hydroxypropyl methacrylate, for example—may be replaced by an —NH$_2$ function.

A type of VRP particularly preferred for use with alkyds which include a flexibilizing moiety in their structure is one in which the polyglycol component is derived from a triol—such as glycerine, for example, and an alkylene oxide—such as propylene oxide, for example. Quite dramatic results have been obtained when the polyol component of the VRP and the flexibilizing moiety in the alkyd are the same. See Example 10 herein, where propoxylated glycerine was incorporated in both the alkyd and the VRP.

Preferably, the VRP has at least two vinyl-reactive end-groups. However, this is not indispensable; VRP's having only one vinyl-reactive end group are considered suitable for the practice of the present invention. On the other hand, a total of three "terminal" vinyl groups (resulting from use of a triol-based polyglycol) is considered advantageous.

All ramifications of the VRP component are of course within the constraint that the VRP exhibit the requisite compatibility with the other components (the polyester or polyester and vinyl monomer components) of the cured composition of the invention. This can readily be checked for any candidate VRP, without undue experimentation, in a manner which will be apparent to those knowledgeable in the art.

For the purposes of the present invention, the urethane oligomers employed have weight average molecular chain extensions, calculated as polystyrene, of less than 100 Å, preferably less than 65 Å. The latter values correspond, respectively, to weight average molecular weights of less than about 22,000 and preferably less than about 9400. A particularly preferred class of oligomers are those which have weight average molecular weights of less than about 8000.

Most preferred among the latter are those oligomers prepared from one molecular proportion of an about 2000 molecular weight polyetherglycol, about 1.7–2 molecular proportions of a monomeric diisocyanate and about 2 molecular proportions of a hydroxyalkyl acrylate or methacrylate, in either of two reaction sequences. That is, the glycol and isocyanate are reacted with each other before the acrylate is introduced or the acrylate and isocyanate are first reacted with each other and the glycol is then introduced (thereby minimizing the molecular weight of the oligomer formed). A typical urethane oligomer made by pre-reacting 2.4 moles of tolylene diisocyanate with 1.2 moles of polypropylene glycol (mol wt. 2000) and then reacting in 2.40 mols of hydroxyethyl acrylate (2/2/1 ratio), was found to have a weight average molecular weight of 7681. When 0.8 mole of the same isocyanate was prereacted with 0.8 mols of the same acrylate and then 0.4 mols of the same glycol reacted in, the oligomer obtained had a weight average molecule weight of 5132.

A type of VRP found particularly suitable for use with internally flexibilized alkyds is one in which the polyglycol is a hydroxyalkylated triol—such as propoxylated glycerine, for example. Such polyglycols have substantially higher molecular weights but the VRP's prepared from them according to the methods disclosed herein still have molecular weights well below 22,000.

Methods of Preparation of VRP's

The vinyl terminated urethane oligomers disclosed in U.S. Pat. Nos. 3,297,745 and 4,360,653 are generally suitable for use as VRP's in the present invention and may be prepared by the several methods disclosed in said patents.

The latter methods are also generally applicable to the preparation of VRP's in which the terminal unsaturation is derived from a hydroxyacrylate-initiated polyol or a phenol-initiated polyol in which the phenol is ring-substituted with an alkenyl group. (See Example J herein.)

Preparation of VRP's by the reaction of an unsaturated isocyanate, such as isopropenyl isocyanate, allyl isothiocyanate and isocyanatoethyl methacrylate, for example, with a polyetherglycol is exemplified herein and does not require any procedures unfamiliar to polyurethane chemists.

In preparing VRP's by the condensation of a hydroxy or aminoalkylacrylate, a diisocyanate and a polyetherglycol, whether the isocyanate is first reacted with the acrylate or the polyglycol is not critical. In either case, however, the reactant ratio in the initial condensation must be controlled to insure the presence of the requisite, unconverted isocyanate end-groups in the intermediate product.

As indicated earlier herein, the reaction sequence does effect and can be utilized to manipulate the viscosity (average molecular weight) of the VRP. If the isocyanate is first reacted with the hydroxyacrylate, the viscosity of the final product will be lower than when the isocyanate is first reacted with the polyol.

VRP to Polymer Ratio

The weight ratio of the VRP to the polyester or polyesteramide in the compositions of the invention can range from about 1/100 to about 3/5; i.e., from about 1 to about 60 parts VRP per hundred parts of the alkyd, or 1–60 "phr". Except when the alkyd has incorporated in it a flexibilizing moiety—as part of the alkyd molecule—the VRP content should be within the range of from about 1–20 phr and preferably is from about 6 to about 16 phr; the range of from about 12 to about 16 phr being particularly preferred. In any case, the content of VRP is such that essentially no "phasing", i.e., formation of a distinct, separate VRP phase, results when the composition is cured.

When the alkyd molecule does include a flexibilizing moiety, the content of the VRP is preferably within the range of from about 41 to about 59 phr.

Copolymerizable Vinyl Monomer

The compositions of the invention preferably comprise a non-resinous, vinyl reactive monomer—which preferably is styrene. Other, specific such monomers, for example, are vinyl toluene, t-butylstyrene, divinyl benzene and chlorostyrene. Various acrylates, as exemplified by dicyclopentadienyl acrylate, sec-butyl acrylate and ethylacrylate, though less preferred, are considered suitable for the practice of the present invention. Thus, suitable vinylic monomers generally are those commonly copolymerized with polymers having terminal or pendant, vinyl-reactive, olefinic or cycloolefinic double bonds. Such monomers are well catalogued in the prior art.

The well known catalysts and procedures for the latter type of copolymerization are also generally applicable to "curing" (chain extension and cross-linking) of the compositions of the present invention which comprise vinyl monomers. Those compositions which do not include vinylic monomers are considered novel per se and may be cured by use of the same catalysts and procedures to thermoset products.

The vinyl monomer, frequently called a reactive diluent, may be employed within a wide range of concentration of from about 20 to 80 percent of diluent to 80 to 20 percent of the polyester of polyesteramide (from about 25 to about 400 phr). The optimum amount will depend in large measure on the particular alkyd, the diluent and the properties desired in the uncured and the cured states. Reactive diluents are employed principally to adjust the viscosity of a resin blend to permit its facile use in a given fabrication procedure. A coating formulation will usually require a lower viscosity than a molding formulation. When the alkyd does not include a flexibilizing group, the preferred vinyl monomer content is from about 58 to about 68 phr. When the alkyd does include a flexibilizing group, from about 130 to about 150 phr of the monomer is preferred.

Other additives that are conventional in the polyester and polyesteramide art may also be included in formulations based upon these modified alkyds. Thus, fillers, pigments and other colorants, reinforcing fibers, and other additives may be added to serve their intended function.

The modified polyesters and polyesteramides are curable by known catalyst systems. Peroxides, such as methylethylketone peroxides, can be used with or without known promoters, such as cobalt octoate or cobalt naphthenate, that function with such peroxides. Acyl peroxides, such as benzoyl peroxides can be used with or without promoters such as tertiary amines, including typically dimethyl aniline and N,N-dimethyl-p-toluidine. The concentrations of catalyst and promoter are adjusted within known limits of from about 0.1 to 3.0 weight percent depending on the rate of cure desired, the magnitude of the generated exotherm and for other known purposes. Known gelation retarding agents, such as p-benzoquinone, can be employed in the curing system.

The compositions of the present invention have properties that make them well adapted for molding, casting, pultrusion, filament winding and other known fabrication procedures. A preferred use is in fabricated parts where improved toughness is necessary yet a high degree of corrosion resistance, heat resistance and electrical insulating ability are still required. Typical of these applications are pultrusion-formed, oil well sucker rods as well as molded parts for exterior automotive use or use in electrical transformer housings.

The uncured compositions of the invention which do not include vinyl monomers (such as styrene, for example) have utility as intermediate materials which can be mixed with such monomers and cured.

EXAMPLES

The following examples are for purposes of illustration and are not be construed as limiting the present invention in a manner inconsistent with the claims appended to these specifications.

Those material names capitalized in the examples are registered trade names.

A. Preparation of a VRP from a polypropylene glycol, toluene diisocyanate and hydroxypropylacrylate A VRP having the statistical structure (III)

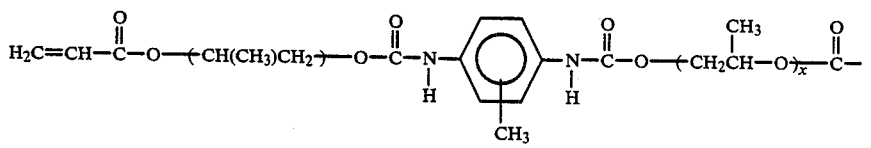
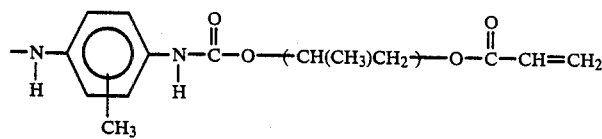

x = ~34 was prepared in two steps; the polyglycol was reacted with the diisocyanate, in the presence of stannous octoate, until the —OH band in the infrared (IR) spectrum of the reaction mixture disappeared and the hydroxyacrylate was then added to react out the remaining isocyanate groups. The detailed procedure follows.

A 0.12% solution of stannous octoate (3.355 grams) in 2811.12 grams (1.4056 g moles) of polypropylene glycol (DOW: P-2000) was added over a period of about 1¾ hours to 488.4 grams (2.8111 g moles) of toluene diisocyanate (Type I, NACONATE 80; registered trade name of the Dow Chemical Company) 80/20 mixture of 2,4- and 2,6-isomers) in a 5-liter resin flask fitted with a reflux condenser and stirrer. The flask contents were heated from an initial temperature of 60° C. to a final temperature of 70° C., during the addition. Stirring was continued at the latter temperature for another ¾ hour, at which time the —OH infrared peak had disappeared. A preformed solution of 1.815 grams of phenothiazine (vinyl polymerization inhibitor) in 330 grams (2.54 g moles) of 2-hydroxypropyl acrylate was then added and the resulting mixture stirred at a temperature of 82°–86° for an additional ⅔ hour, at which point no further decrease in isocyanate absorption (IR) or increase in carbonyl absorption was observable. The product, designated herein as VRP-A, had a Gardener viscosity, at 20° C., equivalent to 79,200 cps. (Acrylate/diisocyanate/glycol mole ratio 1.8/2/1.)

B. Preparation of VRP's from isocyanatoethyl methacrylate and a polyol (1) 80.4 grams (0.52 g mole) of isocyanatoethyl methacrylate, 519.6 grams (0.26 g mole) of P-2000, 0.66 grams of stannous octoate (catalyst) and 0.05 gram of phenothiazine (vinyl stabilizer) were stirred together in a round-bottomed flask for 3 hours. The reaction proceeded, to completion, spontaneously. The resultant VRP exhibited a low viscosity and had the statistical structure IV:

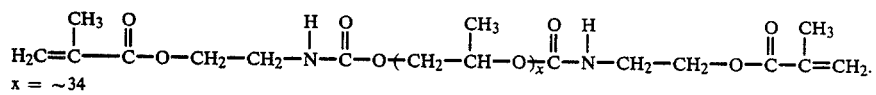

x = ~34

(2) A higher molecular weight VRP was made in two steps. 25.2 Grams (0.145 g mole) of toluene diisocyanate (Type I NACONATE 80) was added slowly to a solution of 0.69 gram of stannous octoate in 574.8 grams (0.2874 g mole) of P-2000. After stirring for several hours, the resulting glycol-extended diurethane was reacted with 44.5 grams (0.287 g mole) of isocyanatoethyl methacrylate as in (1) above. The resultant VRP was substantially more viscous than that obtained in preparation B-(1) and had the statistical structure V:

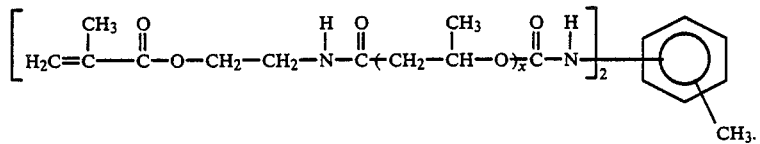

x = ~34

C. Preparation of dicyclopentadiene-modified, unsaturated polyesteramide alkyd Maleic anhydride (7.0 moles, 686.42 grams) was added to a reactor and heated to 100° C. under a nitrogen atmosphere. Water (7.10 moles, 127.94 grams) was added inducing a maximum exotherm of 134° C. one minute later. Fifteen minutes after the initial water addition, the reactor was air cooled to 120° C. and dicyclopentadiene concentrate (2.10 moles, 278.70 grams) was added. The DCPD concentrate contained 0.31% lights, 13.64% cyclopentadiene codimers and diolefin dimers, and 86.05% DCPD. A maximum exotherm to 125° C. resulted three minutes later. Air cooling reduced the reactor temperature to 120° C. A second aliquot of DCPD concentrate (2.10 moles, 278.70 grams) was added fifteen minutes after the initial DCPD concentrate addition. Fifteen minutes later, a final aliquot of DCPD concentrate (2.10 moles, 278.70 grams) was added and the 120° C. reaction temperature was re-achieved three minutes later. After thirty minutes, propylene glycol (3.78 moles, 287.66 grams) and piperazine (0.420 moles, 36.18 grams) were added to the reactor and the steam condenser was started, nitrogen sparging was increased to four liters per minute, and the temperature controller was set at 160° C. The 160° C. temperature was reached twenty-two minutes later. After two hours at 160° C., the temperature controller was set at 205° C. and this temperature was achieved twenty-five minutes later. After ten hours, a total of 157.5 milliliters of water layer and 46.5 milliliters of organic material had accumulated in a Dean Stark trap. The reactor contents were cooled to 168° C. and 100 ppm of hydroquinone was added. The modified polyesteramide alkyd was recovered as a clear, light yellow-colored solid with a final acid number of 26.4.

D. Modification of polyesteramide by a prior art flexibilizing technique, i.e.—using equimolar mixture of propylene and dipropylene glycols as the glycol component A dicyclopentadiene modified unsaturated polyesteramide was prepared using an equimolar propylene glycol and dipropylene glycol mixture. Specifically, the reaction was performed as follows:

Maleic anhydride (7.0 moles, 686.42 grams) was added to a reactor and heated to 100° C. under a nitrogen atmosphere. Water (7.10 moles, 127.94 grams) was added inducing a maximum exotherm of 134° C. one minute later. Fifteen minutes after the initial water addition, the reactor was air cooled to 121° C. and dicyclopentadiene concentrate (2.10 moles, 278.70 grams) was added. The DCPD concentrate contained 0.31% lights, 13.64% cyclopentadiene codimers and diolefin dimers, and 86.05% DCPD. A maximum exotherm of 130° C. resulted three minutes later. Air cooling reduced the reactor temperature to 120° C. A second aliquot of DCPD concentrate (2.10 moles, 278.70 grams) was added fifteen minutes after the initial DCPD concentrate addition. Fifteen minutes later, a final aliquot of DCPD concentrate (2.10 moles, 278.70 grams) was added and the 120° C. reaction temperature was re-achieved three minutes later. After thirty minutes, propylene glycol (1.89 moles, 143.83 grams), dipropylene glycol (1.89 moles, 253.60 grams), and piperazine (0.420 mole, 36.18 grams) were added to the reactor and the steam condensor was started, nitrogen sparging was increased to four liters per minute, and the temperature controller was set at 160° C. The 160° C. temperature was reached twenty-eight minutes later. After two hours at 160° C., the temperature controller was set at 205° C. and this temperature was achieved thirty-four minutes later. After ten hours, a total of 182 milliliters of water layer and 49.5 milliliters of organic material had accumulated in the Dean Stark trap. The reactor was cooled to 168° C. and 100 ppm of hydroquinone was added. The modified polyesteramide alkyd was recovered as a clear, light yellow-colored solid with a final acid number of 25.6.

EXAMPLE 1

Comparison of flexibilizing technique of the present invention with that of the prior art An uncured composition of the present invention was formulated by combining a portion of the foregoing polyesteramide C with styrene and VRP-A in the relative amounts of 57.0, 35.5 and 7.5 wt. %'s, respectively. A clear solution was obtained.

For comparison, formulations containing 57.0% alkyd and 43.0% styrene were made up from each of the foregoing alkyds C and D.

The three resin formulations were tested to determine SPI gel and cure characteristics (84° C.) and Brookfield viscosity (25° C.); a clear, unfilled ⅛" casting of each formulation was made for heat distortion temperature, tensile and fluxural strength, flexural modulus, percent elongation, and average Barcol hardness (934-1 scale) determinations. The clear castings were prepared using a cure system of 1.0% benzoyl peroxide and 0.05% dimethylaniline at room temperature, followed by post-curing for 2.0 hours at 93° C. (200° F.). Mechanical properties of tensile (6) and fluxural (6) test pieces were determined using an Instron machine with ASTM Test Methods O-638 and D-790. Heat distortion temperatures were determined using an Aminco plastic Deflection Tester with ASTM test method D-678. The results are reported in Table 1.

TABLE 1

|  | Alkyd C/Styrene | | Alkyd D/Styrene |
|---|---|---|---|
|  | With VRP-A | Without VRP | (Mixed glycols) |
| Brookfield Viscosity (cp) | 771 | 178 | 143 |
| SPI Gel Test |  |  |  |
| Gel time (min) | 6.1 | 3.2 | 3.1 |
| Cure time (min) | 8.5 | 5.0 | 5.3 |
| Maximum exotherm (°C.) | 174 | 210 | 221 |

TABLE 1-continued

|  | Alkyd C/Styrene | | Alkyd D/ Styrene (Mixed glycols) |
|---|---|---|---|
|  | With VRP-A | Without VRP |  |
| Average Barcol Hardness | 34.5 | 40.8 | 41.1 |
| Heat Distortion Temperature (°F.) | 208 | 225 | 223 |
| Tensile Strength × $10^{-3}$ (psi) | 6.383 | 3.171 | 3.501 |
| Elongation (%) | 2.36 | 0.69 | 0.89 |
| Flexural Strength × $10^{-3}$ (psi) | 13.402 | 11.070 | 14.190 |
| Flexural Modulus × $10^{-5}$ (psi) | 4.44 | 5.34 | 5.34 |

It will be seen that a dramatically greater improvement in tensile strength and % elongation was attained with the VRP than by using mixed glycols; the effect of the VRP on flexural strength was less than that of the mixed glycols but was still significant.

E. Preparation of dicyclopentadiene-modified, unsaturated polyester alkyd

Maleic anhydride (7.0 moles, 686.42 grams) was added to a reactor and heated to 100° C. under a nitrogen atmosphere. Water (7.10 moles, 127.94 grams) was added inducing a maximum exotherm to 131° C. three minutes later. Fifteen minutes after the initial water addition, the reactor was air cooled to 120° C. and dicyclopentadiene concentrate (2.10 moles, 278.70 grams) was added. The DCPD concentrate contained 0.31% lights, 13.64% cyclopentadiene codimers and diolefin dimers, and 86.05% DCPD. A maximum exotherm to 126° C. resulted four minutes later. Air cooling reduced the reactor temperature to 120° C. A second aliquot of DCPD concentrate (2.10 moles, 278.70 grams) was added fifteen minutes after the initial DCPD concentrate addition. Fifteen minutes later, a final aliquot of DCPD concentrate (2.10 moles, 278.70 grams) was added and the 120° C. reaction temperature was re-achieved three minutes later. After thirty minutes, propylene glycol (4.20 moles, 319.62 grams), was added to the reactor and the steam condenser was started, nitrogen sparging was increased to four liters per minute, and the temperature controller was set at 160° C. The 160° C. temperature was reached twenty minutes later. After two hours at 160° C., the temperature controller was set at 205° C. and this temperature was achieved twenty-seven minutes later. After 4.25 hours, a total of 189.5 milliliters of water layer and 60.5 milliliters of organic material had accumulated in a Dean Stark trap. The reactor was cooled to 168° C. and 100 ppm of hydroquinone was added. The modified polyester alkyd was recovered as a clear, light yellow-colored solid with a final acid number of 25.8.

EXAMPLE 2

Flexibilizing effects of VRP on dicyclopentadiene-modified polyester alkyd

An uncured composition of the invention was formulated from the alkyd E (57.0 wt. %), styrene (34.0 wt. %) and VRP-A (9.0 wt. %). For comparison, a formulation without the VRP component was made up from the same alkyd (57.0 wt. %) and styrene (43.0 wt. %). The physical and mechanical properties of the two formulations were determined as in Example 1 and are reported in Table 2.

TABLE 2

|  | ALKYD-E/STYRENE | |
|---|---|---|
|  | With VRP-A | Without VRP |
| Brookfield Viscosity (cp) | 194 | 44 |
| SPI Gel Test |  |  |
| Gel time (min) | 9.72 | 5.1 |
| Cure time (min) | 13.1 | 7.6 |
| Maximum exotherm (°C.) | 170 | 183 |
| Average Barcol Hardness | 32.3 | 44.0 |
| Heat Distortion Temperature (°F.) | 191 | 219 |
| Tensile Strength × $10^{-3}$ (psi) | 7.589 | 4.243 |
| Elongatilon (%) | 3.48 | 1.16 |
| Flexural Strength × $10^{-3}$ (psi) | 14.708 | 10.559 |
| Flexural Modulus × $10^{-5}$ (psi) | 4.62 | 6.18 |

Again, a dramatic improvement in tensile strength % elongation and flexural strength will be seen to have resulted from inclusion of the VRP.

F. Preparation of modified unsaturated polyesteramide using higher purity (98%) dicyclopentadiene Maleic anhydride (7.0 moles, 686.42 grams) was added to a reactor and heated to 100° C. under a nitrogen atmosphere. Water (7.10 moles, 127.94 grams) was added, inducing a maximum exotherm to 135° C. one minute later. Fifteen minutes after the initial water addition, the reactor was air-cooled to 121° C. and 98% dicyclopentadiene (2.10 moles, 277.64 grams) was added. A maximum exotherm to 125° C. resulted two minutes later. Air cooling reduced the reactor temperature to 120° C. A second aliquot of dicyclopentadiene (2.10 moles, 277.64 grams) was added fifteen minutes after the initial dicyclopentadiene addition. A maximum exotherm to 127° C. resulted four minutes later. Air cooling reduced the temperature of the reactor contents to 120° C. Fifteen minutes after the second dicyclopentadiene addition, a final aliquot of dicyclopentadiene (2.10 moles, 277.64 grams) was added and the 120° C. reaction temperature was re-achieved two minutes later. After thirty minutes, propylene glycol (3.78 moles, 287.66 grams) and piperazine (0.420 moles, 36.18 grams) were added to the reactor and the steam condenser was started, nitrogen sparging was increased to four liters per minute, and the temperature controller was set at 160° C. The temperature was reached seventeen minutes later. After two hours at 160° C., the temperature controller was set at 205° C. and this temperature was achieved twenty-five minutes later. After fourteen hours, a total of 175 milliliters of water layer and 27 milliliters of organic material had accumulated in a Dean Stark trap. The reactor was cooled to 168° C. and 100 ppm of hydroquinone was added. The modified polyesteramide alkyd was recovered as a clear, light yellow-colored solid with a final acid number of 18.8.

EXAMPLE 3

Effect of VRP on impact strength of Alkyd F

Portions of alkyd F were formulated with varying amounts of VRP-A and styrene to provide six different, uncured compositions of the present invention. Izod impact strengths were determined on unnotched, clear, unfilled ⅛" castings prepared at room temperature from each formulation using a cure system of 1.0% benzoyl peroxide and 0.05% dimethylaniline and then postcured 2 hours at 93° C. (200° F.). Ten 2.5"×0.5"×0.125" test pieces were prepared from each casting and tested (ASTM method D256) using a TMI Impact Tester No. 43-1.

The compositions and impact strengths of the formulations are given in Table 3.

TABLE 3

| Formulation | | | Izod Impact Strength |
|---|---|---|---|
| Alkyd F Wt. %/Grams | VRP-A Wt. %/Grams | Styrene Wt. %/Grams | (Unnotched) Ft. lbs./In. |
| 57.0/85.5 | None[1] | 43.0/64.5 | 0.8 |
| " | 2.0/3.0 | 41.0/61.5 | 1.3 |
| " | 4.0/6.0 | 39.0/58.5 | 1.5 |
| " | 7.0/10.5 | 36.0/54.0 | 2.5 |
| " | 9.0/13.3 | 34.0/51.0 | 1.7 |
| " | 11.0/16.5[2] | 32.0/48.0 | 1.3 |

NOTE:
[1] For comparison; not an embodiment of invention.
[2] Cured casting showed opacity; believed due to phasing-out of some of VRP.

An optimum VRP content for impact strength improvement will be noted. It will also be apparent, by extrapolation, that even as little as 1 wt. % of the VRP would effect a substantial improvement in impact strength.

G. Pilot plant scale preparation of dicyclopentadiene-modified, unsaturated polyesteramide A dicyclopentadiene-modified, unsaturated polyesteramide resin was prepared in a 10-gallon, 316 stainless steel reactor. The reactor was equipped with mechanical stirring, flowmeter controlled inlet lines and associated valving for nitrogen, water, dicyclopentadiene, propylene glycol-piperazine solution, and styrene. The respective liquid reactants were metered into the reactor from individual stainless steel bombs under positive nitrogen pressure with calibrated pumps. A digital scale was used to monitor the weight loss from each bomb during pumping. Heating and cooling was provided to the reactor jacket via a recirculating pump for the heat transfer fluid. Trombone cooling coils with a water curtain system provided for rapid cooling when activated. The reactor overhead section was fitted with a manway (for charging solid maleic anhydride briquettes or hydroquinone) and a steam-jacketed condenser. The overhead section of the steam condenser was chilled via a referigeration unit. Liquid from the condenser accumulated in a receiver fitted with a drain valve. Product was recovered from the reactor through a gate valve into a 10-micron filter assembly which led to a valved drumming outlet.

The following reaction stoichiometry was used:

| Maleic anhydride | 7940 grams |
|---|---|
| Water | 1600 grams |
| Dicyclopentadiene (96%) | 9630 grams |
| 11.17% wt. piperazine in propylene glycol solution | 3750 grams |
| Hydroquinone | 2.75 grams |
| Styrene | 12,803 grams. |

The following reaction sequence was used:

| Reaction Step | Cumulative Reaction Time |
|---|---|
| Maleic anhydride charged | 0 minutes |
| ½ Water charged to stirred 90° C. maleic anhydride solution | 28 minutes |
| Dicyclopentadiene addition started | 30 minutes |
| ½ Water charged | 45 minutes |
| Dicyclopentadiene addition completed | 58 minutes |
| Hydrolysis reaction completed | 2.0 hours |
| [% dicyclopentadiene/acid number] unreacted | [1.0%/255] |
| Piperazine-propylene glycol solution added and temperature controller set at 160° C. | 2.0 hours 20 minutes |
| Reaction at 160° C. completed [acid number] | 4.0 hours 15 minutes [129] |
| Temperature set at 205° C. | 4.0 hours 25 minutes |
| Nitrogen sparge set at 1 GPH | 12.0 hours 15 minutes |
| Reaction at 205° C. completed and cooling started [acid number] | 17.0 hours 15 minutes [19.7] |
| Hydroquinone added | 17.0 hours 43 minutes |
| Styrene added | 18.0 hours 50 minutes |
| Styrenated resin drummed | 20.0 hours 15 minutes |

EXAMPLE 4

Effect of VRP-A on properties of Alkyd G

A portion of the styrenated alkyd G was formulated with VRP-A in the relative amounts of 92.5% and 7.5%, by weight, respectively, to provide an uncured composition of the present invention. A second portion of styrenated alkyd G was used as such, for comparison.

(A) Clear, unfilled castings of the VRP-modified and the unmodified alkyd resin (styrenated alkyd) were prepared and tested as in Example 1. The results are given in Table 4.

TABLE 4

|  | Resin with VRP-A (7.5%) | Resin without VRP |
|---|---|---|
| Brookfield Viscosity (cp) | 243 | 132 |
| SPI Gel Test | | |
| Gel time (min) | 6.6 | 3.0 |
| Cure time (min) | 10.2 | 5.5 |
| Maximum exotherm (°C.) | 187 | 216 |
| Average Barcol Hardness | 40 | 46 |
| Heat Distortion Temperature (°F.) | 215 | 235 |
| Tensile Strength × $10^{-3}$ (psi) | 7.6 | 5.5 |
| Elongation (%) | 2.2 | 1.2 |
| Flexural Strength × $10^{-3}$ (psi) | 12.1 | 13.1 |
| Flexural Modulus × $10^{-5}$ (psi) | 4.8 | 5.9 |

Again, improvements in tensile strength and % elongation resulted from inclusion of the VRP.

It is to be noted that the to-be-expected decreases in flexural moduli, Barcol hardnesses, heat distortion temperatures (and reactivity) experienced—as indicated in the several foregoing tables—are not such that said properties of the flexibilized resins are outside of the acceptable ranges for most, if not all, end uses.

(B) Ductility comparisons were carried out, according to the Biaxial Yield Test methods of P. B. Bowden and J. A. Jukes, Journal of Materials Science, 3, 183 (1968) and 7, 52 (1972), on test specimens prepared from 0.0625" thick, clear, unfilled castings of the VRP-modified and unmodified alkyd and having the following dimensions: 6.500" long×0.625" wide at tab ends and 0.400" wide at center.

The specimen cross-sectional area was 0.025 in², the tensile load was increased in 564 psi increments and the creep rate (yield) was about 0.002"/minute. Tension vs. compression yield point values (psi) were plotted and the plot extrapolated to give tensile and compressive yield strength values. Ductility was calculated as 1 minus the ratio of compression at break to compressive yield strength. (Ductility may alternatively be calculated as the ratio of tension at break to tensile yield strength.) The results are given in Table 5.

TABLE 5

|  | Resin with VRP-A (7.5%) | Resin without VRP |
|---|---|---|
| Ductility | 0.409 | 0.060 |
| Tension at Break (psi) | 4,419 | 919 |
| Compression at Break (psi) | 9,236 | 18,515 |
| Tensile Yield Strength (psi) | 10,800 | (1) |
| Compressive Yield Strength (psi) | 15,522 | 19,697 |
| Breakpoint | pp[2] | pp[2] |
| Last Weight Increment Added (lbs.) | 2 | 0 |

[1] Cannot be extrapolated accurately with datapoints collected.
[2] Prior pinchpoint.

A very substantial and significant improvement in ductility upon incorporation of the VRP is evident. A correspondingly "tougher" resin results.

H. Preparation of a VRP having an ideal structure incorporating two polyglycol units and three diisocyanate units (Acrylate/diisocyanate/glycol mole ratio=1/1.5/1)

A mixture of 2473 grams (1.2365 gram moles) of polypropylene glycol (P-2000) and 1 gram of stannous octoate was added with stirring to a mixture of 330 grams (1.897 g moles) of toluene diisocyanate (80/20 mixture of 2,4-and 2,6-isomers) and 0.465 grams of stannous octoate and stirring was continued until the reaction was complete (—OH IR absorption gone). 162.5 Grams (1.25 g moles) of 2-hydroxyethyl acrylate (and a small amount of methylethylhydroquinone vinyl stabilizer) was then stirred into the reaction mixture and allowed to react until the —OH IR absorption was minimized and the urethane carbonyl absorption maximized. A small amount of toluene diisocyanate was added to react out the last of the —OH and then the residual —NCO was reacted out by adding about 0.5–1.0 grams of isopropanol. The resulting product, a very viscous, clear light yellow-colored liquid, was then diluted with styrene to an 80 wt. % VRP content solution, designated herein as "VRP-H".

(COMPARATIVE) EXAMPLE 5

Effects of VRP-H on properties of dicyclopentadiene-modified, unsaturated polyesteramide Alkyd F)

This example demonstrates the relatively poor toughening which results when substantial phasing out occurs during curing. 199.5 grams of alkyd F was mixed with 32.81 grams of the VRP/styrene solution (VRP-H) and with 122.69 grams of styrene to provide a 57% alkyd/7.5% VRP and 35.5 wt. % styrene formulation. A 57% alkyd/43% styrene formulation (no VRP) was made up from the same alkyd (F) for comparison. The physical and mechanical properties of the two formulations were determined by the methods described in the in the previous examples herein. The results are given in Table 6.

TABLE 6

| Property | Formulation With VRP-H | Formulation Without VRP |
|---|---|---|
| Brookfield Viscosity (cp) | 919 | 184 |
| SPI Gel Test |  |  |
| Gel Time (min) | 7.6 | 2.7 |
| Cure Time (min) | 10.1 | 7.9 |
| Maximum Exotherm (°C.) | 202 | 221 |
| Average Barcol Hardness | 35 | 41 |
| Heat Distortion Temperature (°F.) | 231 | 239 |
| Tensile Strength $\times 10^{-3}$ (psi) | 5.4 | 5.1 |
| Elongation (%) | 2.7 | 1.1 |
| Flexural Strength $\times 10^{-3}$ (psi) | 10.3 | 14.5 |
| Flexural Modulus $\times 10^{-5}$ (psi) | 3.8 | 5.9 |
| Unnotched Izod Impact (ft. lbs./in.) | 2.4 | 0.8 |

A small increase in tensile strength and substantial increases in elongation and impact strength may be noted. Virtually no change in heat distortion temperature occurred.

It was observed that the cured formulation samples containing VRP-H were opaque, indicating that at least some of the VRP had phase separated. The relatively low improvement in tensile strength experienced is believed attributable to this pronounced phasing behavior. (Effective toughening requires increases in both tensile strength and elongation.)

I. Preparation of a VRP comprising alkylene oxide-extended hydroxy-functional acrylate end groups Polypropylene glycol (0.06375 mole, 127.5 grams) with an average molecular weight of 2000 and containing dissolved stannous octoate (0.1105 gram) and an organo tin salt commercially available from Witco Chemical Co. as Fomrez UL-28 (0.1105 gram) was added over a one-minute period to a glass reactor containing stirred toluene diisocyanate (0.1275 mole, 22.21 grams) under a nitrogen atmosphere. The toluene diisocyanate used was an 80 to 20 weight percent mixture of the 2,4- and 2,6-isomers, respectively. A maximum exotherm to 51° C. occurred three minutes later; then the reaction temperature was increased to 60° C. After 44 minutes at the 60° C. reaction temperature, infrared spectrophotometric analysis of a film sample of the transparent reaction product demonstrated that the reaction of the isocyanate with the aliphatic hydroxyl group was complete (disappearance of hydroxyl group, appearance of urethane carbonyl group). 51.19 Grams (0.1275 moles) of the mono(2-hydroxyethylacrylate)ether of pentapropylene glycol-1,2 was then added. The reaction temperature was maintained at 60° C. and after 78 minutes, infrared spectrophotometric analysis of a film sample of the transparent reaction product demonstrated that the reaction of the remaining isocyanate groups with the aliphatic hydroxyl group was complete. Hydroquinone (100 ppm) was added to the reactor and the resulting VRP (designated herein as VRP-I) was recovered. (Acrylate/diisocyanate/glycol mole ratio=2/2/1.)

The oligomer (VRP-I) had the statistical structure (VI):

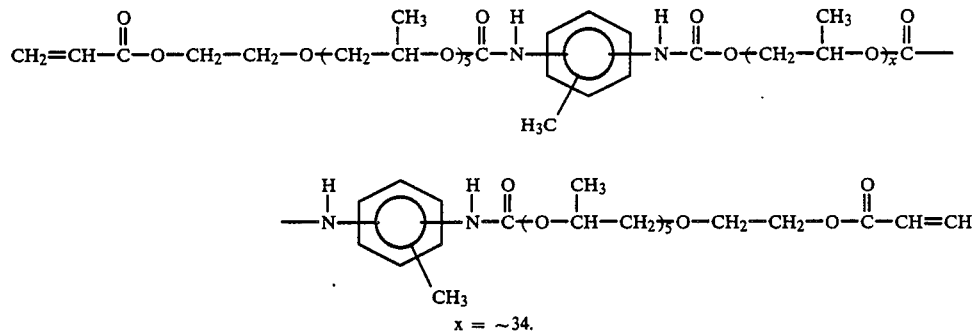

x = ~34.

and, by reason of the at least ten more propylene oxide units it contains, has a substantially higher molecular weight than VRP-A.

EXAMPLE 6

Effect of VRP-I on properties of alkyd F

Borderline example of the invention.

199.5 Grams of alkyd F was combined with 129.25 grams of styrene and 26.25 grams of VRP-I to give a 57.0/35.5/7.5% formulation (an uncured composition of the present invention). A portion of the 57% alkyd/43% styrene formulation described in Example 5 was used for comparison. The properties of the two formulations given in Table 7 were determined by the methods described earlier herein.

TABLE 7

| | Alkyd F/Styrene Formulation | |
|---|---|---|
| | With VRP-I | Without VRP |
| Brookfield Viscosity (cp) | 647 | 184 |
| SPI Gel Test | | |
| Gel Time (min) | 4.4 | 2.7 |
| Cure Time (min) | 7.3 | 4.9 |
| Maximum Exotherm (°C.) | 201 | 221 |
| Average Barcol Hardness | 40 | 41 |
| Heat Distortion Temperature (°F.) | 238 | 239 |
| Tensile Strength × $10^{-3}$ (psi) | 5.6 | 5.1 |
| Elongation (%) | 1.6 | 1.1 |
| Flexural Strength × $10^{-3}$ (psi) | 11.1 | 14.5 |
| Flexural Modulus × $10^{-5}$ (psi) | 4.5 | 5.9 |
| Unnotched Izod Impact (ft. lbs./in.) | 1.7 | 0.8 |

The increase in elongation was less than that obtained with VRP-H in Example 5.

However, it is interesting to note the greater increase in tensile strength and quite small decreases in HDT and Barcol hardness consequent upon inclusion of the VRP. In this case, only a very slight haziness was observed in the (otherwise clear) cured VRP-comprising specimens. This may be attributable not only to the molecular weight increase resulting from the extra propylene oxide units (vis-a-vis VRP-A; same stoichiometry) but also to the effect of inserting the extra units between the acrylate and carbamate groups in the oligomer. (Use of a lower proportion of VRP-I than 7.5% might result in elimination of the haziness in the cured composition.)

J. Preparation of a vinyl-terminated urethane oligomer ("VRP-J") comprising isopropenyl phenol-derived end groups. (Vinylic phenol/diisocyanate/glycol mole ratio 2/2/1)

Toluene diisocyanate (0.255 mole, 44.41 grams), p-isopropenyl phenol (0.255 mole, 34.21 grams), and phenothiazine (0.055 weight percent, 0.167 grams) were added to a glass reactor and maintained under a nitrogen atmosphere with stirring. The toluene diisocyanate was an 80 to 20 weight percent mixture of the 2,4- and 2,6-isomers, respectively. The p-isopropenyl phenol contained less than 1.6 weight percent dimer and only a trace of residual phenol. The reactants were heated to 45° C. A catalyst package consisting of an organo tin salt commercially available from Witco Chemical Co. as FOMREZ UL-28 (0.152 grams) and a tertiary amine commercially available from Abbot Labs as Polycat DBU (0.152 grams) was added to the stirred slurry and air cooling of the reactor exterior was started. A maximum exotherm to 82° C. occurred four minutes later. Cooling reduced the temperature of the reactor contents to 60° C. and this temperature was maintained for 56 minutes. At this time, infrared spectrophotometric analysis of a film sample of the transparent, pale yellow-colored reaction product demonstrated that the reaction of the isocyanate with the phenolic hydroxyl was essentially complete (disappearance of hydroxyl group, appearance of carbonyl group). Polypropylene glycol (0.1275 mole, 225.0 grams) with an average molecular weight of 2000 was added to the reactor, followed by the addition of more catalyst, Witco FOMREZ UL-28 (0.076 grams) and POLYCAT DBU (0.152 grams). A maximum exotherm of 68° C. occurred eleven minutes later. Cooling reduced the reaction temperature to 65° C. and this reaction temperature was maintained for 3.8 hours. At this time, infrared spectrophotometric analysis of a film sample of the white-colored, viscous, liquid reaction product demonstrated that the reaction of the remaining isocyanate groups with the aliphatic hydroxyl groups was complete. The reactor contents were cooled and a vinyl-reactive "oligomer" (VRP-J) of the following statistical formula (VII) was recovered:

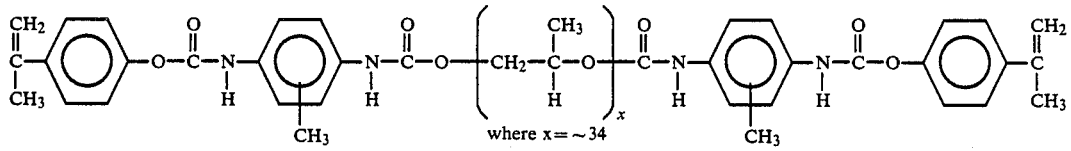

-continued
where x = ~34.

EXAMPLE 7

Effect of VRP-J on properties of a dicyclopentadiene-modified, unsaturated polyester (essentially identical to alkyd E)

A curable composition of the present invention was prepared by blending together 199.5 grams of the modified polyester alkyd, 24.5 grams of VRP-J and 126.0 grams of styrene. Cured test specimens were prepared from the latter solution (57% alkyl/7% VRP/36% styrene) and from a 57% alkyl/43% styrene (no VRP) blend and tested as described in the previous examples herein. The results are given in Table 8, following.

TABLE 8

| | Alkyd/Styrene Formulation | |
|---|---|---|
| | With VRP-J | Without VRP |
| Brookfield Viscosity (cp) | 158 | 42 |
| SPI Gel Test | | |
| Gel Time, min. | 5.5 | 3.0 |
| Cure Time, min. | 11 | 5.5 |
| Maximum Exotherm (°C.) | 176 | 226 |
| Average Barcol Hardness | 35 | 35 |
| Heat Distortion Temperature, °F. | 190 | 238 |
| Tensile Strength, × $10^{-3}$ (psi) | 6.7 | 4.6 |
| Elongation (%) | 2.1 | 0.9 |
| Flexural Strength, × $10^{-3}$ (psi) | 14.6 | 9.7 |
| Flexural Modulus, × $10^{-5}$ (psi) | 4.3 | 6.1 |
| | 2,964,764 | 4,205,828 |
| Unnotched Izod Impact Strength ft.-lbs./in. | 1.6 | 1.0 |
| Biaxial Yield Test: | | |
| Ductility | 0.67 | 0.07 |
| Tension at break, psi | 6,773 | 869 |
| Compression at break, psi | 5,084 | 19,011 |
| Tensile Yield Strength, psi | 10,100 | * |
| Compressive Yield Strength, psi | 15,407 | 20,382 |

*Cannot be extrapolated accurately from datapoints collected.

Impressive improvements in tensile strength, elongation, flexural strength, impact strength and ductility will be seen to have resulted from inclusion of the VRP.

EXAMPLE 8

Effect of VRP-J on properties of a dicyclopentadiene-modified, unsaturated polyesteramide essentially identical to alkyd F A 199.5 gram portion of the polyesteramide alkyd was mixed with 126.0 grams of styrene and 24.5 grams of VRP-J to provide an uncured composition of the invention comprising 57% by wt. of the resin, 36% styrene and 7% of the VRP. An otherwise identical formulation, sans VRP, and containing 57% alkyd and 43% styrene was made up for comparison. The physical and mechanical properties of the two formulations were determined as described earlier herein and are given in Table 9.

TABLE 9

| | Alkyd/Styrene Formulation | |
|---|---|---|
| | With VRP-J | Without VRP |
| Brookfield Viscosity (cp) | 669 | 184 |
| SPI Gel Test | | |
| Gel Time, min. | 5.4 | 2.7 |

TABLE 9-continued

| | Alkyd/Styrene Formulation | |
|---|---|---|
| | With VRP-J | Without VRP |
| Cure Time, min. | 9.6 | 4.9 |
| Maximum Exotherm (°C.) | 179 | 221 |
| Average Barcol Hardness | 36 | 46 |
| Heat Distortion Temperature, °F. | 212 | 239 |
| Tensile Strength, × $10^{-3}$ (psi) | 6.0 | 5.1 |
| Elongation (%) | 1.9 | 1.1 |
| Flexural Strength, × $10^{-3}$ (psi) | 9.7 | 14.5 |
| Flexural Modulus, × $10^{-5}$ (psi) | 4.1 | 5.9 |
| Unnotched Izod Impact Strength Ft.-lb./in. | 1.7 | 1.0 |

It will again be seen that substantial improvements in tensile strength, elongation and impact strength resulted from inclusion of the VRP. The other properties were not significantly degraded.

The parts of VRP per hundred parts of resin, or phr values, corresponding to the wt. percent compositions given in the foregoing Examples are given below in Table 10.

TABLE 10 phr Contents of VRP and Styrene in Exemplary Compositions of the Present Invention

| Example No. | Alkyd Wt. % | Styrene Wt. % | Styrene phr | VRP- Wt. % | VRP- phr | Notes |
|---|---|---|---|---|---|---|
| 1 | C 57.0 | 35.5 | 62.28 | A 7.5 | 13.16 | |
| 2 | E 57.0 | 34.0 | 59.65 | A 9.0 | 15.79 | |
| 3 | F 57.0 | 41.0 | 71.93 | A 2.0 | 3.51 | |
| | " | 39.0 | 68.42 | 4.0 | 7.02 | |
| | " | 36.0 | 63.16 | 7.0 | 12.28 | Best of Series |
| | " | 34.0 | 59.65 | 9.0 | 15.79 | |
| | " | 32.0 | 56.14 | 11.0 | 19.30 | |
| 4 | G 92.5 | (Includes Styrene) | | A 7.5 | 8.11 | |
| 5 | F 57.0 | 35.5 | 62.28 | H 7.5 | 13.16 | |
| 6 | F 57.0 | 35.5 | 62.28 | I 7.5 | 13.16 | |
| 7 | like E 57.0 | 36.0 | 63.16 | J 7.0 | 12.28 | |
| 8 | like F 57.0 | 36.0 | 63.16 | J 7.0 | 12.28 | |

An additional class of polycycloalkenyl-terminated unsaturated polyesters of polyesteramides suitable for use in the present invention is taught in a co-pending application of the present inventor, Ser. No. 545,024, filed Oct. 24, 1983, the disclosure of which is hereby incorporated herein by reference. A resin oil is used to prepare this class of polyester or polyesteramide alkyds (or resins).

Resin oils are complex mixtures which contain three distinct types of components:

esterifiable hydrocarbon reactives including dicyclopentadiene, methyl dicyclopentadiene, indene, methyl indene, cyclopentadiene codimers, diolefin dimers and the like; ethylenically unsaturated aromatic hydrocarbon reactives including styrene, vinyl toluene, allyl benzene and the like; and non-reactive hydrocarbons including aromatic, alkylaromatic, polyalkylaromatic hydrocarbons and the like.

The resin oils which may be used herein are generally obtained as distillation cuts from hydrocarbon processing. The composition of the resin oil can vary within wide limits depending on the hydrocarbon feedstock being processed, the type of process, the distillation conditions and many other known variables. The amount of the esterifiable hydrocarbon reactives component operable in these reactions can vary from about 25 percent by weight (pbw) to about 95+ pbw. The amount of the ethylenically unsaturated aromatic hydrocarbon reactives component can vary from about 5 pbw to about 50 pbw. The remainder is the non-reactive hydrocarbon component.

The new class of unsaturated polyesters or polyesteramides may be made by the previously described methods. The prehydrolysis method is most preferred wherein a 50 to 100 mole percent excess of water based on moles of maleic anhydride used is employed. In these methods, the esterifiable hydrocarbon reactives components, such as dicyclopentadiene and the like are incorporated into the unsaturated polyester or polyesteramide in the same manner as previously described herein, for example for dicyclopentadiene. This reaction occurs in the presence of the ethylenically unsaturated aromatic hydrocarbon reactives and non-reactive hydrocarbon components of said resin oil. In the most preferred process of the present invention, the ethylenically unsaturated aromatic hydrocarbon reactives undergo polymerization reactions concurrently with the reaction of the esterifiable hydrocarbon reactives. However, it is operable to partially or totally polymerize the ethylenically unsaturated aromatic hydrocarbon reactives component prior to reaction of the esterifiable hydrocarbon reactives.

When a resin oil is used, a substantial amount of the non-reactive hydrocarbon component is removed along with the water from the reaction. Lesser amounts of non-reactive hydrocarbon component remaining in the unsaturated polyester are useful for plasticization and flexibilization of the unsaturated polyester, thus resulting in improved mechanical properties.

The resulting product is a hydrocarbon-modified unsaturated polyester or polyesteramide alkyd containing the polymerization products of the ethylenically unsaturated aromatic hydrocarbon reactives component and, optionally, minor amounts of the non-reactive hydrocarbon component. The alkyd is blended with an ethylenically unsaturated monomer as hereinbefore described.

K. Preparation of Resin Oil Modified Unsaturated Polyesteramide Resin

A resin oil modified unsaturated polyesteramide resin was prepared in a 100-gallon 316 stainless steel reactor. The reactor was equipped with mechanical stirring, flowmeter controlled inlet lines and associated valving for nitrogen, water, resin oil, ethylene glyol-piperazine solution and styrene. The resin oil used contained 63.06 percent by weight (pbw) esterifiable hydrocarbon reactives consisting of isoprene-cyclopentadiene codimer (1.65 pbw), indene (4.03 pbw), methyl cyclopentadiene-cyclopentadiene codimer (6.17 pbw), butadiene-cyclopentadiene codimer (5.32 pbw) and dicyclopentadiene (45.89 pbw); ethylenically unsaturated aromatic hydrocarbon reactives consisting of styrene and vinyl toluenes (15.96 pbw); cycloopentadiene (1.56 pbw); and non-reactive hydrocarbons (19.42 pbw). The respective liquid reactants were metered into the reactor from individual drums using calibrated drum pumps. A scale was used to monitor the weight loss from each drum during pumping. Heating and cooling were provided to the reactor jacket via a recirculting pump for the heat transfer fluid. Heat was provided to the heat transfer fluid reservoir via a pair of thermostated in-line electric heaters. Finned cooling coils with a water curtain provided for rapid cooling when activated. The reactor overhead section was fitted with a manway for charging solid maleic anhydride briquettes or hydroquinone and a steam-jacketed condensor. A chilled water condensor and knock-out pot fitted with a drain valve were used to recover condensate from the steam-jacketed condensor. Product was recovered from the reactor through a ram valve into a 10 micron filter assembly and to a valved drumming outlet.

The following reaction stoichiometry and sequence were used:

| Reaction Step | Cumulative Reaction Time |
| --- | --- |
| Water addition (31 pounds at 1.9 gph) started into 100° C. stirred solution of maleic anhydride (169 lbs.) under 0.375 scfh nitrogen | 0 minutes |
| First 31 pounds of water in, start bulk addition of second 31 pounds of water | 1 hour, 45 minutes |
| All water added, reaction temperature between 90–110° C., start recycling water and hydrocarbon distillate back into reactor | 1 hour, 50 minutes |
| Start resin oil addition (320.1 pounds at 0.66 gpm) | 2 hours |
| Resin oil addition completed temperature controller set at 135° C. | 2 hours, 55 minutes |
| Hydrolysis reaction completed, recycle of water and hydrocarbon distillate into reactor stopped (acid number = 218) | 4 hours, 55 minutes |
| Piperazine-ethylene glycol solution (66.7 pounds) added, temperature controller set at 160° C., nitrogen sparge set to 7.5 scfh, 2,5-di-tert-butylhydroquinone (12.6 grams) added as process inhibitor | 5 hours, 50 minutes |
| Reaction at 160° C. completed, temperature controller set at 205° C. (acid number = 120) | 7 hours, 50 minutes |
| 205° C. reached | 10 hours |
| Nitrogen sparge set at 2.75 scfh | 11 hours, 40 minutes |
| Reaction at 205° C. completed, cooling started, turn nitrogen sparge down to 0.375 scfh | 15 hours, 30 minutes |
| Hydroquinone (58.9 grams) added at 150° C. (acid number = 27) | 16 hours, 40 minutes |
| 2% $O_2$ in $N_2$ started at 125° C. | 17 hours, 15 minutes |
| Styrene (372.4 pounds) added at 110° C. | 18 hours |
| Styrenated resin drummed[1] | 19 hours, 30 minutes |

[1]Contained 43 percent by styrene

L. Preparation of VRP-L
(Acrylate/diisocyanate/polyol Ratio=3/3/1)

Toluene diisocyanate (208.99 grams; 1.2 moles) and phenothiazine (0.31 gram) were added to a reactor and maintained at 21° C. under a nitrogen atmosphere with stirring. A mixture of a polypropylene (ethylene) glycol adduct of glycerin prepared by reaction of a 92.0 percent propylene oxide, 8.0 percent ethylene oxide mixture with glycerin to a 3000 average molecular weight (1200 grams; 0.4 moles), stannous octoate (0.85 grams) and an oroganotin salt (Dabco 33LV) (0.85 gram) were added over a ten-minute period and so as to maintain a reaction temperature of 56° C. After completion of the addition, the reaction temperature was increased to 65° C. and held for 75 minutes. At the end of this post reaction time, 2-hydroxyethyl acrylate (139.27 grams; 1.20 moles) was added over a one-minute period. An exotherm to 73° C. occurred and the reactor was then heated to 76° C. and held at this temperature for 90 minutes. The product was inhibited with 0.08 gram of hydroquinone and then recovered in essentially quantitative yield.

EXAMPLE 9

Effect of VRP-L on Resin K

Clear, unfilled ⅛ inch castings were prepared and evaluated (as previously described) using the specified blends of the Resin Oil-modified unsaturated polyesteramide resin and VRP-L. The following results were obtained:

| Percent by Weight VRP | None[1] | 4.9 | 10.0 | 15.2 |
|---|---|---|---|---|
| Tensile Strength (psi) | 7220 | 7170 | 5800 | 2790 |
| Elongation (%) | 1.70 | 2.20 | 4.40 | 12.40 |
| Flexural Strength (psi) | 10,390 | 10,740 | 10,310 | 4,780 |
| Flexural Modulus (psi) | 604,000 | 633,900 | 313,000 | 149,300 |
| Visual Appearance | Monophasic | Monophasic | Monophasic | Monophasic |

[1]Not an embodiment of the invention

The difference in tensile strengths for the compositions containing 0 and 4.9 weight percents of the VRP-L is within the range of experimental error and is not considered significant. Inasmuch as elongation was substantially increased, however, toughening was accomplished at the 4.9 percent level.

EXAMPLE 10

Combination of an internally flexibilized alkyd and a VRP in which the polyglycol component is a hydroxyalkylated glycerine

A. Preparation of Vinyl Terminated Urethane Oligomer from a Hydroxyalkylated Glycerin, Toluene Diisocyanate and 2-Hydroxyethyl Acrylate Toluene diisocyanate (1.20 moles, 208.99 grams) and phenothiazine (0.02 percent by weight 0.31 gram) were added to a reactor and maintained with stirring at 21° C. under a nitrogen atmosphere. The toluene diisocyanate used was an 80 to 20 weight percent mixture of the 2,4- and 2,6-isomers, respectively. Polypropylene (ethylene) glycol adduct of glycerin prepared by reaction of a 92.0 percent propylene oxide then 8.0 percent ethylene oxide with glycerin to a 3000 average molecular weight (1.20 moles of hydroxyl groups, 1200.0 grams) was mixed with stannous octoate (0.055 percent by weight, 0.85 gram) and a tertiary alkyl amine catalyst (Dabco 33LV) (0.055 percent by weight, 0.85 gram) and this mixture was added to the reactor over a 10 minute (800 s) period. A maximum exotherm of 56° C. was obtained at the end of the hydroxyalkylated glycerin and catalyst addition, then heating commenced and a reaction temperature of 65° C. was achieved six (360 s) minutes later. The reaction was allowed to progress for 75 minutes (4500 s) at 65° C. after which time infrared spectrophotometric analysis of a film sample of the reaction product demonstrated essentially complete reaction (disappearance of hydroxyl group absorbance). At this time, 2-hydroxyethyl acrylate (1.20 moles, 139.27 grams) was added to the reactor over a one-minute (60 s) period. A maximum exotherm of 73° C. occurred, then the reactor was heated to 76° C. and held at this temperature for 90 minutes (5400 s) after which time infrared spectrophotometric analysis of a film sample of the reaction product demonstrated essentially complete reaction (disappearance of isocyanate group absorbance). Hydroquinone (0.08 gram) was added as an inhibitor and the product was recovered as a transparent, viscous liquid of the following statistical structure, corresponding to a molecular weight of 3830:

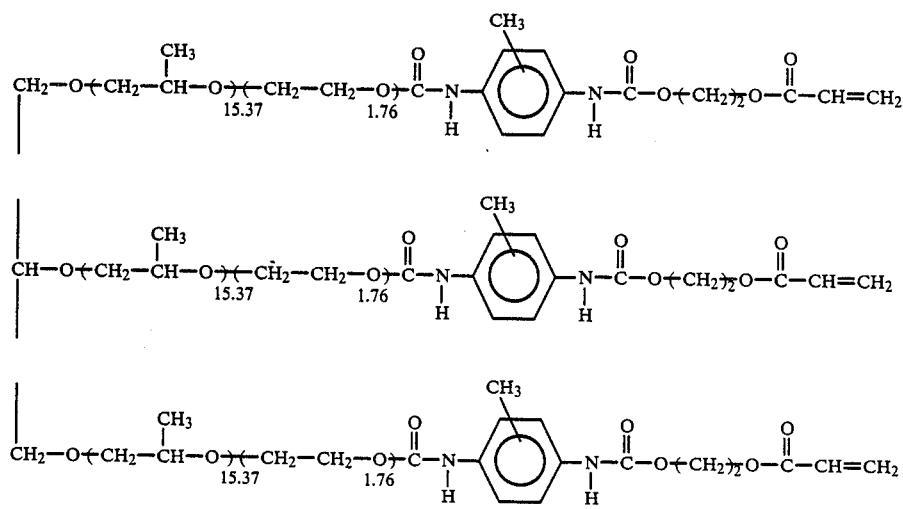

B. Preparation of Dicyclopentadiene Modified Unsaturated Polyesteramide with Flexibilizing Glycol Ether Component A dicyclopentadiene modified unsaturated polyesteramide was prepared in a 100 gallon, 316 stainless steel reactor. The reactor was equipped with mechanical stirring, flowmeter controlled inlet lines and associated valving for nitrogen, dicyclopentadiene concentrate, propylene glycol-piperazine-polypropoxylate of glycerin with propylene oxide (1 to 9 mole ratio) solution, and styrene. The dicyclopentadiene concentrate contained 99.23 percent by weight esterifiable hydrocarbon reactives including 81.4 percent by weight dicyclopentadiene, 11.86 pbw isoprene-cyclopentadiene codimer, 0.16 pbw tricyclopentadiene and 0.59 pbw methyl cyclopentadienecyclopentadiene codimer.

The respective liquid reactants were metered into the reactor from individual drums using calibrated drum pumps. A scale was used to monitor the weight loss from each drum during pumping. Heating and cooling were provided to the reactor jacket via a recirculating pump for the heat transfer fluid. Heat was provided to the heat transfer fluid reservoir via a pair of thermostatted in-line electric heaters. Finned cooling coils with a water curtain provided for rapid cooling when activated. The reactor overhead section was fitted with a manway for charging solid maleic anhydride briquettes or hydroquinone and a steam-jacketed condenser. A chilled water condenser and knock-out pot fitted with a drain valve were used to recover condensate from the steam-jacketed condenser. Product was recovered from the reactor through a ram valve into a 10 micron filter assembly and to a valved drumming outlet.

The following reaction stoichiometry was used:

| | |
|---|---|
| maleic anhydride | 144.2 pounds |
| water | 29.1 pounds |
| dicyclopentadiene concentrate | 175.5 pounds |
| 72.64% wt. polypropoxylate of glycerin and 4.34% wt. piperazine in propylene glycol solution | 175.1 pounds |
| hydroquinone | |
| Addition 1 | 5.6 grams |
| Addition 2 | 58.9 grams |
| styrene | 372.4 pounds |

The following reaction sequence was used:

| Reaction Step | Cumulative Reaction Time |
|---|---|
| Water addition started into 70° C. stirred solution of maleic anhydride and hydroquinone (addition 1) under 0.38 scfh nitrogen | 0 minutes |
| Dicyclopentadiene concentrate addition started | 2 minutes |
| Water and dicyclopentadiene concentrate additions completed | 2 minutes |
| Hydrolysis reaction completed (acid number) | 4 hours 45 minutes (259) |
| Piperazine-propylene glycol-glycerin polypropoxylate solution added, temperature controller set at 160° C., nitrogen sparge set to 2 scfh | 5 hours |
| Reaction at 160° C. completed and temperature set at 205° C. | 7 hours 45 minutes |
| Nitrogen sparge set at 2.8 scfh | 15 hours 45 minutes |
| Reaction at 205° C. completed and cooling started (acid number) | 19 hours 45 minutes (27) |
| Hydroquinone (addition 2), 2% O$_2$ in N$_2$ started | 20 hours 40 minutes |
| Styrene added at 110° C. | 22 hours 40 minutes |
| Styrenated resin drummed[1] | 25 hours 10 minutes |

[1]Contained 43 percent by weight styrene.

C. Preparation and Curing of Vinyl Terminated Urethane Oligomer and Dicyclopentadiene Modified Unsaturated Polyesteramide Resin Formulations Portions of the vinyl terminated urethane oligomer from A above and portions of the dicyclopentadiene modified unsaturated polyesteramide resin from B above were blended with additional styrene to provide the following formulations:

| | Formulations (wt. percent/PHR) | | |
|---|---|---|---|
| Component | A Wt. %/PHR | B Wt. %/PHR | C Wt. %/PHR |
| Vinyl terminated urethane oligomer | 14.8/40.8 | 17.2/49.6 | 19.5/58.5 |
| Dicyclopentadiene modified unsaturated polyesteramide alkyd (styrene-free basis) | 36.3/100 | 34.7/100 | 33.3/100 |
| Styrene (from resin plus added) | 48.9/135 | 48.1/139 | 47.2/142 |

Clear unfilled ⅛ inch castings were prepared using a cure system consisting of 2% by wt. methyl ethyl ketone peroxide, 0.6% by wt. cobalt naphthenate (6%) and 0.3% by wt. dimethylaniline at room temperature (25° C.). The castings were post-cured at 100° C. for 2.0 hours, then used to prepare test pieces for evaluation of mechanical properties. The results were as follows:

| | FORMULATION | | |
|---|---|---|---|
| | A | B | C |
| Brookfield Viscosity (cp) | 95 | 102 | 105 |
| Elongation (%) | 35.8 | 42.5 | 43.6 |
| Tensile Strength (psi) | 5185 | 4248 | 3793 |
| Barcol Hardness | 12 | 12 | 14 |
| Visual Appearance | Monophasic | Monophasic | Monophasic |

Using a cure system of 2.25% by wt. methyl ethyl ketone peroxide, 0.4% by wt. cobalt naphthenate (6%) and 0.2% by wt. dimethylaniline with formulation C provided the following results in the SPI gel test (84° C.):

| | |
|---|---|
| gel time | 0.9 min. |
| cure time | 2.75 min. |
| maximum exotherm | 160.6° C. |

Using a cure system of 1.50% by wt. benzoyl peroxide and 0.5% by wt. dimethylaniline with formulation C provided the following results in the SPI gel test (84° C.):

| | |
|---|---|
| gel time | 1.25 min. |
| cure time | 3.4 min. |
| maximum exotherm | 181.8° C. |

It will be seen that extraordinarily high percent elongation values resulted. The tensile strength decreased as the amount of the VRP was increased from 40.8 to 58.5 phr but was still more than adequate. Formulations (VRP/alkyd/styrene resins) of the type disclosed in this example have been found eminently suitable for inclusion in so-called polymer concretes to be used in bridge surface overlays.

What is claimed is:

1. A curable, flexibilized polyester composition comprising, in admixture:
   a. an unsaturated polyester—or polyesteramidealkyd having at least one polycycloalkenyl end group and optionally including a polyglycol-derived flexibilizing group,
   and
   b. a flexibilizing urethane oligomer having (1) two or more terminal groups, at least one of which is vinyl reactive, and (2) a weight average molecular chain extension, calculated as polystyrene, of less than 100 Å, said oligomer having been formed by the reaction of a vinyl compound independently selected from the group consisting of hydroxyethyl or hydroxypropyl esters of acrylic or methacrylic acid, monoacrylates or methacrylates polyethylene-, polypropylene- or polybutylene glycols, isocyanatoethyl-, or isocyanatopropyl esters of acrylic or methacrylic acid, vinyl- or isopropenyl-isocyanate or an isopropenyl phenol with a polyether glycol or the reaction product of a polyetherglycol with a diisocyanate the parts by weight of said oligomer per hundred parts of said alkyd being such that the oligomer will not phase out when said composition is cured and being within the range of from about 1 to about 60 when the alkyd includes said flexibilizing group but being about 20 or less when the latter group is not included in the alkyd.

2. The composition of claim 1 including from about 25 to about 400 parts by weight of a non-resinous, vinyl monomer per hundred parts of said alkyd.

3. The composition of claim 1 in which said alkyd has two of said polycycloalkenyl end groups.

4. The composition of claim 1 in which at least two of the terminal groups in said oligomer are vinyl-reactive.

5. The composition of claim 3 in which at least two of the terminal groups in such oligomer are vinyl-reactive.

6. The composition of claim 5 in which said oligomer is derivable from 2-hydroxypropylacrylate and has the statistical formula

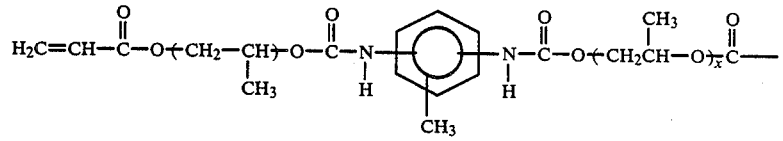

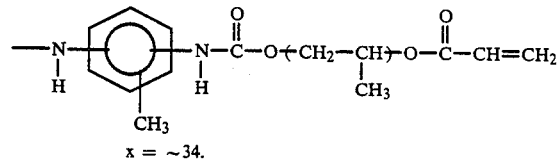

$x = \sim 34.$

7. The composition of claim 5 in which said oligomer is derivable from 2-isocyanatoethyl methacrylate and has the statistical formula

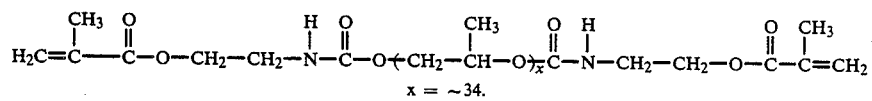

$x = \sim 34.$

8. The composition of claim 5 in which said oligomer is derivable from the mono(2-hydroxyethylacrylate)ether of pentapropyleneglycol-1,2 and has the statistical formula

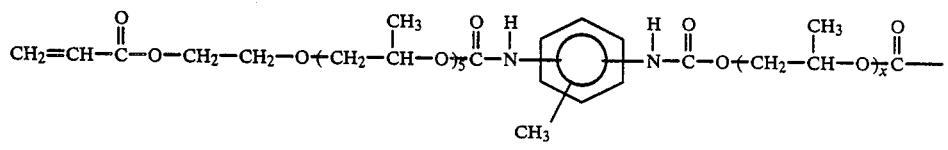

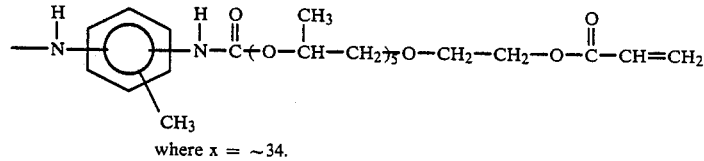

where $x = \sim 34.$

9. The composition of claim 5 in which said oligomer is derivable from p-isopropenyl phenol and has the structural formula

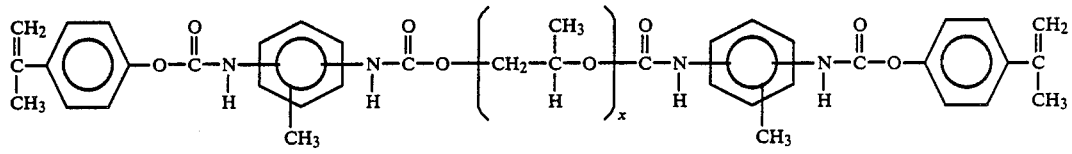

where x = ~34.

10. The composition of claim 2 including, as said monomer, from about 25 to about 400 parts by weight of styrene per 100 parts of said alkyd.

11. The composition of claim 10 in which said alkyd does not include said flexibilizing group and the styrene is present in the amount of from about 58 to about 68 phr.

12. The composition of claim 10 in which the alkyd includes said flexibilizing group and the styrene is present in the amount of from about 130 to about 150 phr.

13. The composition of claim 11 in which said oligomer is derivable from 2-hydroxypropylacrylate and has the statistical formula

14. The composition of claim 11 in which said oligomer is derivable from 2-isocyanatoethylmethacrylate and has the statistical formula

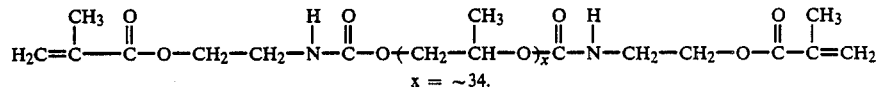

x = ~34.

15. The composition of claim 11 in which said oligomer is derivable from the mono(2-hydroxyethylacrylate)ether of pentapropyleneglycol-1,2 and has the statistical formula

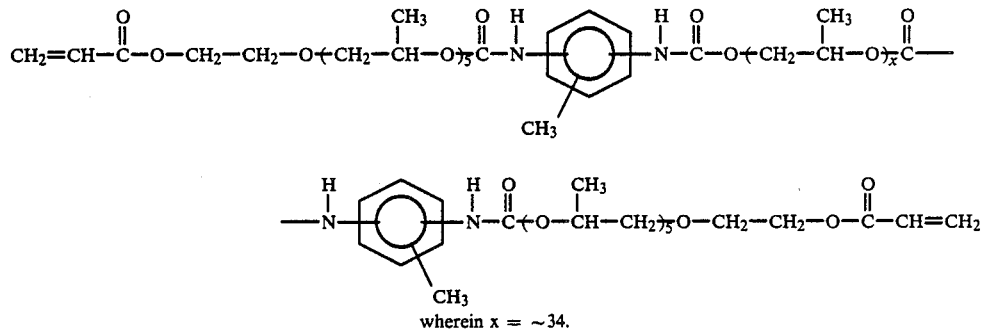

wherein x = ~34.

16. The composition of claim 11 in which said oligomer is derivable from p-isopropenyl phenol and has the statistical formula

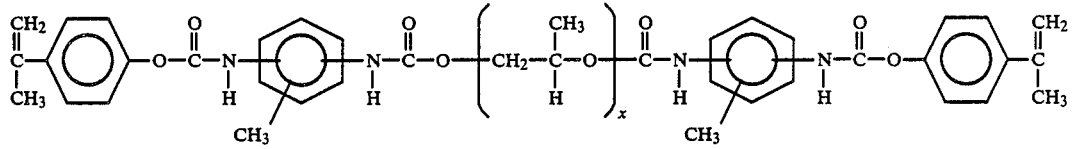

where x = ~34.

17. The composition of claim 12 in which said oligomer is derivable from 2-hydroxypropylacrylate and has the statistical formula

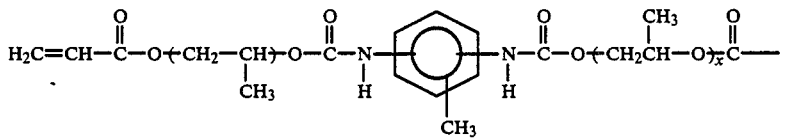
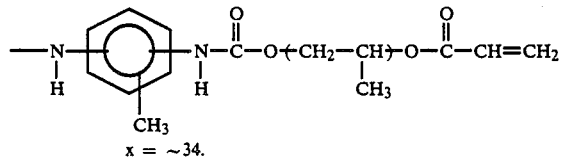

x = ~34.

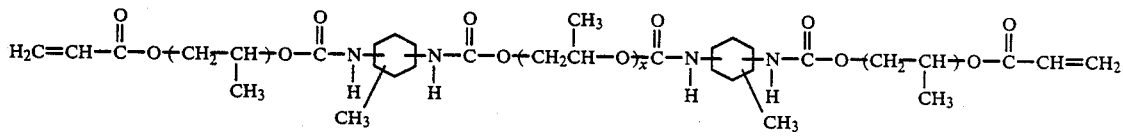

x = ~34.

18. The composition of claim 12 in which said oligomer is deriveable from 2-isocyanatoethylmethacrylate and has the statistical formula

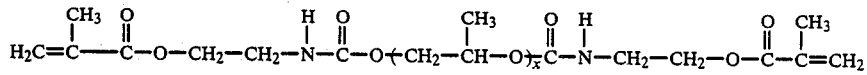

x = ~34.

19. The composition of claim 12 in which said oligomer is deriveable from the mono(2-hydroxyethylacrylate)ether of pentapropyleneglycol-1,2 and has the statistical formula

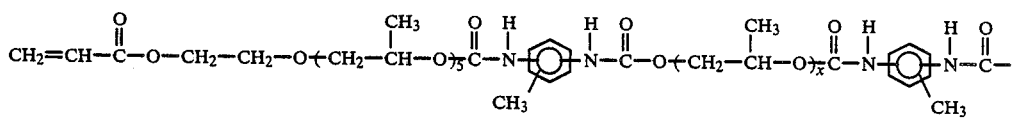

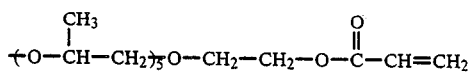

wherein x = ~34.

20. The composition of claim 12 in which said oligomer is deriveable from p-isopropenyl phenol and has the statistical formula

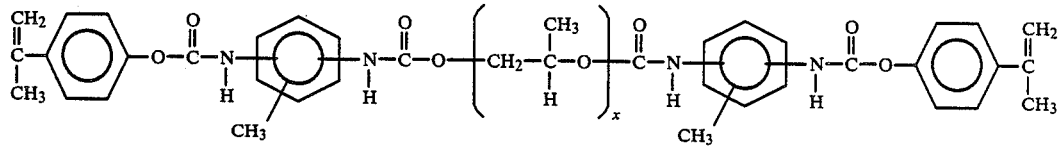

where x = ~34.

21. The composition of claim 11 in which the amount of said oligomer is from about 6 to about 16 phr.

22. The composition of claim 21 in which the amount of said oligomer is from about 12 to about 16 phr.

23. The composition of claim 12 in which the amount of said oligomer is from about 41 to about 59 phr.

24. The composition of claim 5 in which said alkyd is the reaction product of
(a) dicyclopentadiene or a concentrate thereof, maleic acid and, optionally, water, or
(b) dicyclopentadiene or a concentrate thereof, water, and maleic anhydride or a mixture thereof with maleic acid,
with
a polyol and, optionally, a diamine.

25. The composition of claim 24 including from about 25 to about 400 parts by weight of styrene per hundred parts of said alkyd.

26. The composition of claim 25 in which the alkyd does not include said flexibilizing group, the amount of styrene is from about 58 to about 68 phr and the amount of said oligomer is from about 6 to about 16 phr.

27. The composition of claim 26 in which said terminal vinyl groups are derived from 2-hydroxypropyl acrylate and said oligomer had the statistical formula

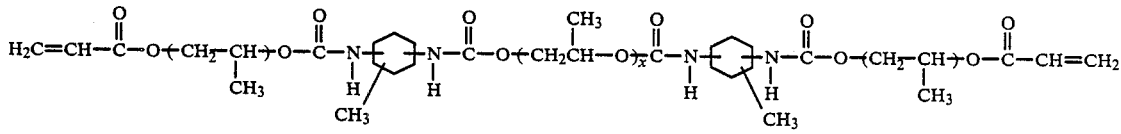

x = ~34.

28. The composition of claim 26 in which said terminal vinyl groups are derived from 2-isocyanatoethyl methacrylate and said oligomer had the statistical formula

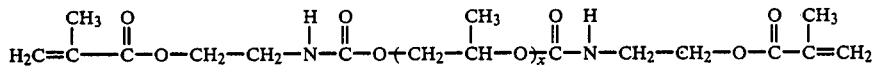

x = ~34.

29. The composition of claim 26 in which said terminal groups are derived from the mono(2-hydroxyethylacrylate)ether of pentapropyleneglycol-1,2 and said oligomer has the statistical formula

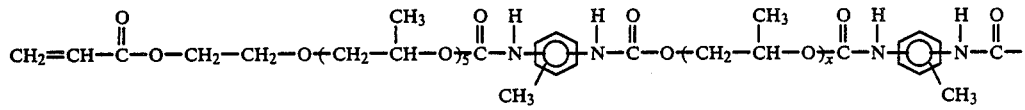
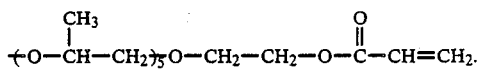

wherein x = ~34.

30. The composition of claim 26 in which said terminal groups are derived from p-isopropenyl phenol and said oligomer has the statistical formula

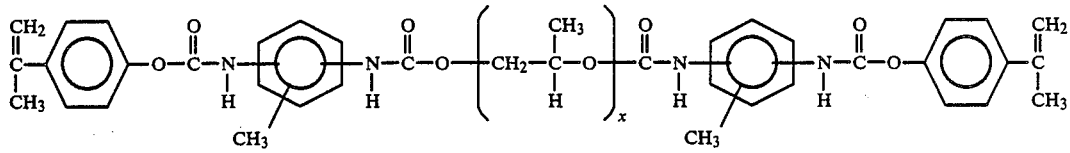

where x = ~34.

31. The composition of claim 24 in which said alkyd includes a flexibilizing group derived from a polyglycol which constitutes said polyol and the polyglycol-moiety in said oligomer is derived from an alkoxylated triol.

32. The composition of claim 31 in which said polyol is also an alkoxylated triol.

33. The composition of claim 32 in which said flexibilizing group in said alkyd and said polyetherglycol moiety in said oligomer are both derived from the same alkoxylated triol.

34. The composition of claim 33 in which said alkoxylated triol is a propoxylated glycerine.

35. The composition of claim 31 including from about 25 to about 400 parts by weight of styrene per hundred parts of said alkyd.

36. The composition of claim 35 in which the amount of said styrene is from about 130 to about 150 phr.

37. The composition of claim 31, 32, 33, 34, 35 or 36 in which the amount of said oligomer is within the range of from about 38 to about 60 phr.

38. The composition of claim 1 in which said alkyd is Resin Oil-modified.

39. The composition of claim 1 in which said oligomer is a reaction product of one molecular proportion of a polyetherglycol, about 1.7–2 molecular proportions of a monomeric diisocyanate and about 2 molecular proportions of a hydroxyalkyl acrylate or methacrylate.

40. The composition of claim 39 in which said polyetherglycol is a polypropylene glycol.

41. The composition of claim 40 in which said polyetherglycol has a molecular weight of about 2000.

42. The cured composition of claim 1, 10, 11, 12, 22, 23, 24, 26, 31, 32, 33, 34, 35, 36, 38, 39, 40 or 41.

* * * * *

UNITED STATES PATENT AND TRADEMARK OFFICE
CERTIFICATE OF CORRECTION

PATENT NO. : 4,777,209

DATED : October 11, 1988

INVENTOR(S) : Robert E. Hefner, Jr.

It is certified that error appears in the above-identified patent and that said Letters Patent is hereby corrected as shown below:

Col. 1, line 35, delete "a" and insert -- as --;

Col. 2, line 18, after "units" insert -- (as defined --;

Col. 2, line 24, delete "th" and insert -- the --;

Col. 3, line 37, after "polyesters" insert -- but --;

Col. 8, line 52, delete "or" should read --of--;

Col. 8, line 55, "initial" has been misspelled;

Col. 9, line 4, delete "a";

Col. 10, line 7 and line 23, "isopropenyl" has been misspelled;

Col. 13, line 36, after "not" insert -- to --;

Col. 27, line 68, "cyclopentadiene" has been misspelled;

Col. 28, line 6, "recirculating" has been misspelled;

Col. 29, line 12, "organotin" has been misspelled;

UNITED STATES PATENT AND TRADEMARK OFFICE
CERTIFICATE OF CORRECTION

PATENT NO. : 4,777,209

DATED : October 11, 1988

INVENTOR(S) : Robert E. Hefner, Jr.

It is certified that error appears in the above-identified patent and that said Letters Patent is hereby corrected as shown below:

Col. 30, lines 47-68, should read as follows:

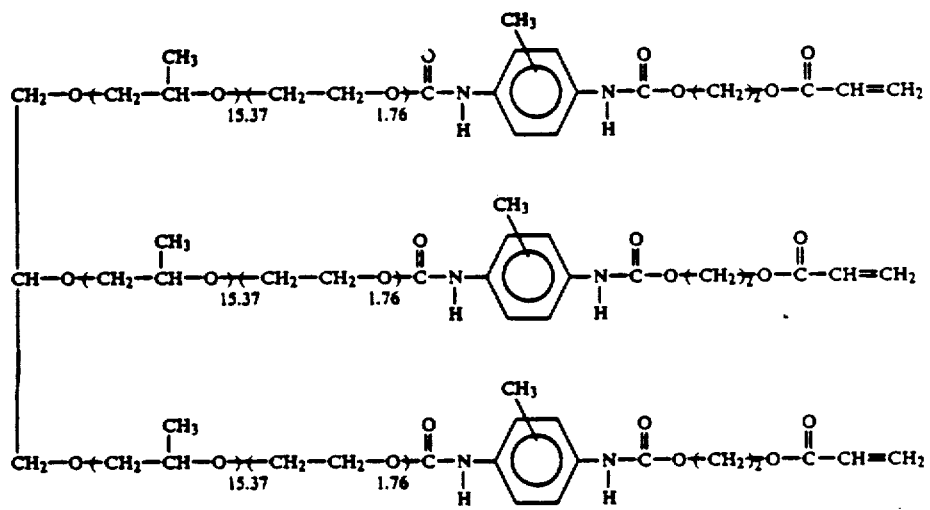

UNITED STATES PATENT AND TRADEMARK OFFICE
CERTIFICATE OF CORRECTION

PATENT NO. : 4,777,209

DATED : October 11, 1988

INVENTOR(S) : Robert E. Hefner, Jr.

It is certified that error appears in the above-identified patent and that said Letters Patent is hereby corrected as shown below:

Col. 36, Claim 16, second line, "p-isopropenyl" has been misspelled;

Signed and Sealed this

Third Day of October, 1989

Attest:

DONALD J. QUIGG

Attesting Officer

Commissioner of Patents and Trademarks